United States Patent
Koyama et al.

(10) Patent No.: US 8,144,013 B2
(45) Date of Patent: Mar. 27, 2012

(54) SEMICONDUCTOR DEVICE

(75) Inventors: Jun Koyama, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 420 days.

(21) Appl. No.: 12/358,349

(22) Filed: Jan. 23, 2009

(65) Prior Publication Data

US 2009/0195387 A1    Aug. 6, 2009

(30) Foreign Application Priority Data

Jan. 31, 2008   (JP) ................................. 2008-020376

(51) Int. Cl.
*H04Q 5/22*    (2006.01)
(52) U.S. Cl. .................... 340/572.1; 340/10.1
(58) Field of Classification Search .................. None
See application file for complete search history.

(56) References Cited

U.S. PATENT DOCUMENTS

| | | | | |
|---|---|---|---|---|
| 5,478,996 | A * | 12/1995 | Muto et al. ..................... | 235/441 |
| 6,049,903 | A | 4/2000 | Nishimura | |
| 6,078,791 | A * | 6/2000 | Tuttle et al. .................. | 455/90.1 |
| 6,224,965 | B1 | 5/2001 | Haas et al. | |
| 6,403,221 | B1 | 6/2002 | Nakamura et al. | |
| 6,473,601 | B1 * | 10/2002 | Oda ............................. | 455/132 |
| 6,621,410 | B1 * | 9/2003 | Lastinger et al. .......... | 340/10.42 |
| 6,872,634 | B2 | 3/2005 | Koizumi et al. | |
| 7,049,178 | B2 | 5/2006 | Kim et al. | |
| 7,230,316 | B2 * | 6/2007 | Yamazaki et al. ........... | 257/531 |
| 7,485,489 | B2 | 2/2009 | Björbell | |
| 7,649,463 | B2 * | 1/2010 | Tuttle .......................... | 340/572.1 |
| 2004/0119820 | A1 * | 6/2004 | Nagao et al. .................. | 348/143 |
| 2005/0208899 | A1 * | 9/2005 | Hanabusa ..................... | 455/69 |
| 2005/0210302 | A1 * | 9/2005 | Kato et al. ..................... | 713/320 |
| 2005/0233122 | A1 | 10/2005 | Nishimura et al. | |
| 2007/0063920 | A1 | 3/2007 | Shionoiri et al. | |
| 2007/0089028 | A1 | 4/2007 | Ito et al. | |
| 2007/0241200 | A1 * | 10/2007 | Sawachi ....................... | 235/492 |
| 2007/0275506 | A1 * | 11/2007 | Yamazaki et al. ............ | 438/118 |
| 2008/0143531 | A1 * | 6/2008 | Tadokoro .................... | 340/572.1 |
| 2008/0186182 | A1 * | 8/2008 | Kurokawa .................. | 340/572.1 |
| 2008/0252254 | A1 * | 10/2008 | Osada .......................... | 320/108 |
| 2008/0254572 | A1 * | 10/2008 | Leedy .......................... | 438/109 |
| 2008/0303345 | A1 | 12/2008 | Ikeda | |

(Continued)

FOREIGN PATENT DOCUMENTS

EP    1 092 739    4/2001

(Continued)

*Primary Examiner* — David Graybill
(74) *Attorney, Agent, or Firm* — Eric J. Robinson; Robinson Intellectual Property Law Office, P.C.

(57) ABSTRACT

A semiconductor device with improved reliability, in which increase in power consumption can be reduced. The semiconductor device includes an antenna for transmitting and receiving a wireless signal to/from a communication device and at least first and second functional circuits electrically connected to the antenna. The first functional circuit includes a power supply control circuit for controlling power supply voltage output from a power supply circuit in the second functional circuit. A power supply control circuit in the second functional circuit includes a transistor of which first terminal is electrically connected to an output terminal of the power supply circuit and second terminal is electrically connected to a ground line. A gate terminal of the transistor is electrically connected to the power supply control circuit included in one functional circuit.

21 Claims, 20 Drawing Sheets

U.S. PATENT DOCUMENTS

| | | | |
|---|---|---|---|
| 2009/0195359 A1* | 8/2009 | Koyama et al. | 340/10.1 |
| 2009/0195387 A1* | 8/2009 | Koyama et al. | 340/572.1 |
| 2010/0253478 A1* | 10/2010 | Koyama et al. | 340/10.1 |
| 2011/0121887 A1* | 5/2011 | Kato et al. | 327/534 |

FOREIGN PATENT DOCUMENTS

| | | |
|---|---|---|
| EP | 1 589 797 | 10/2005 |
| JP | 63-164630 | 7/1988 |
| JP | 10-092980 | 4/1998 |
| JP | 63-164630 | 7/1998 |
| JP | 2001-331772 | 11/2001 |
| JP | 2002-083277 | 3/2002 |
| WO | WO 01/01740 | 1/2001 |
| WO | WO 2004/001848 | 12/2003 |

* cited by examiner

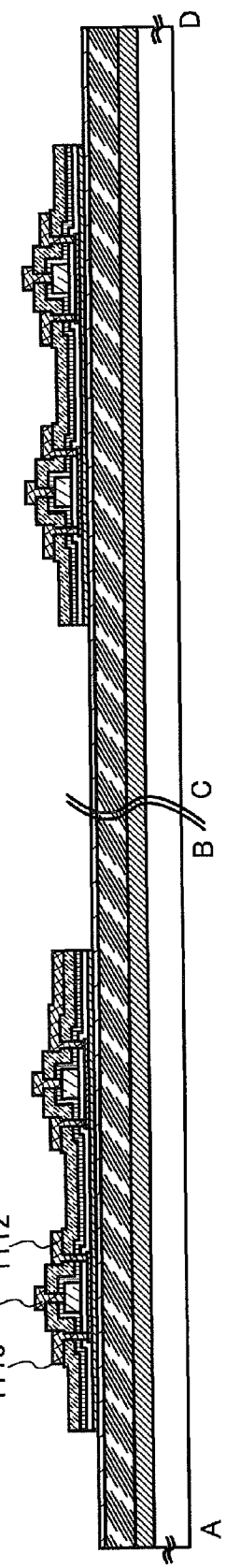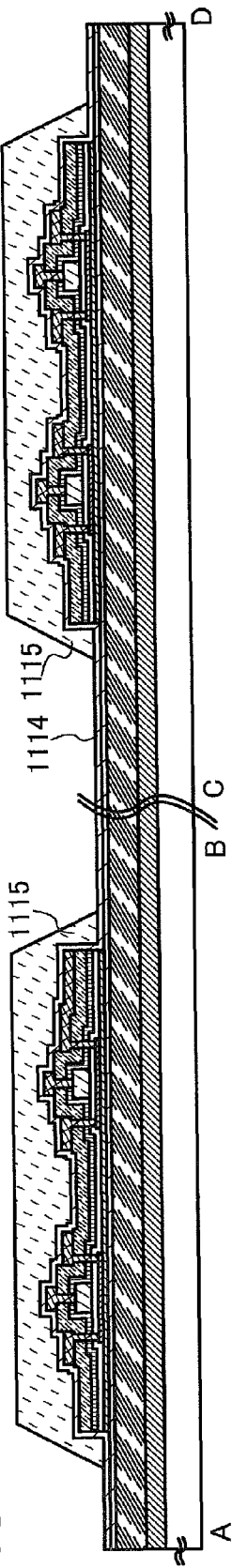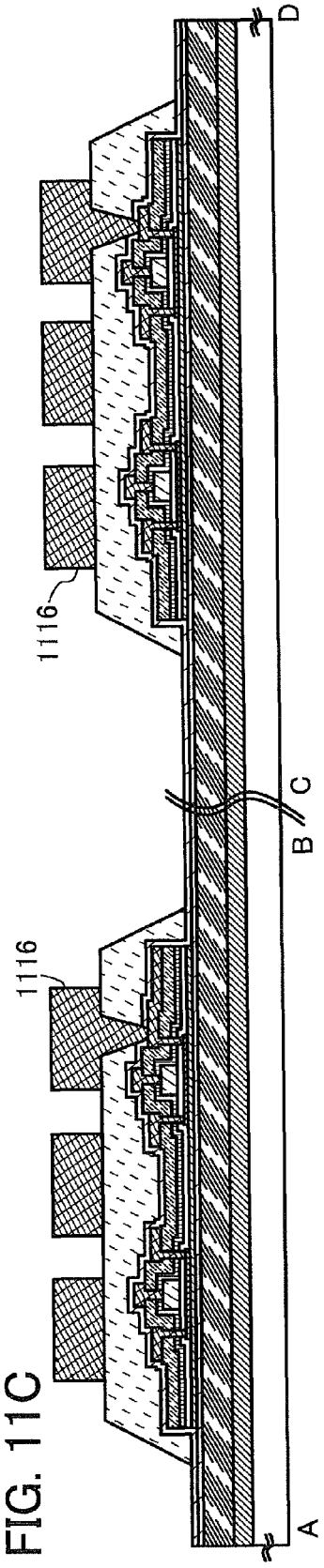

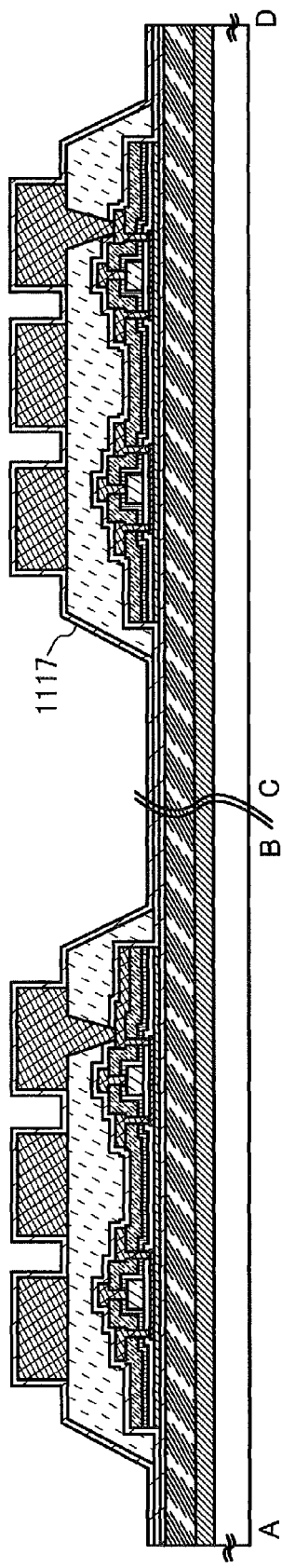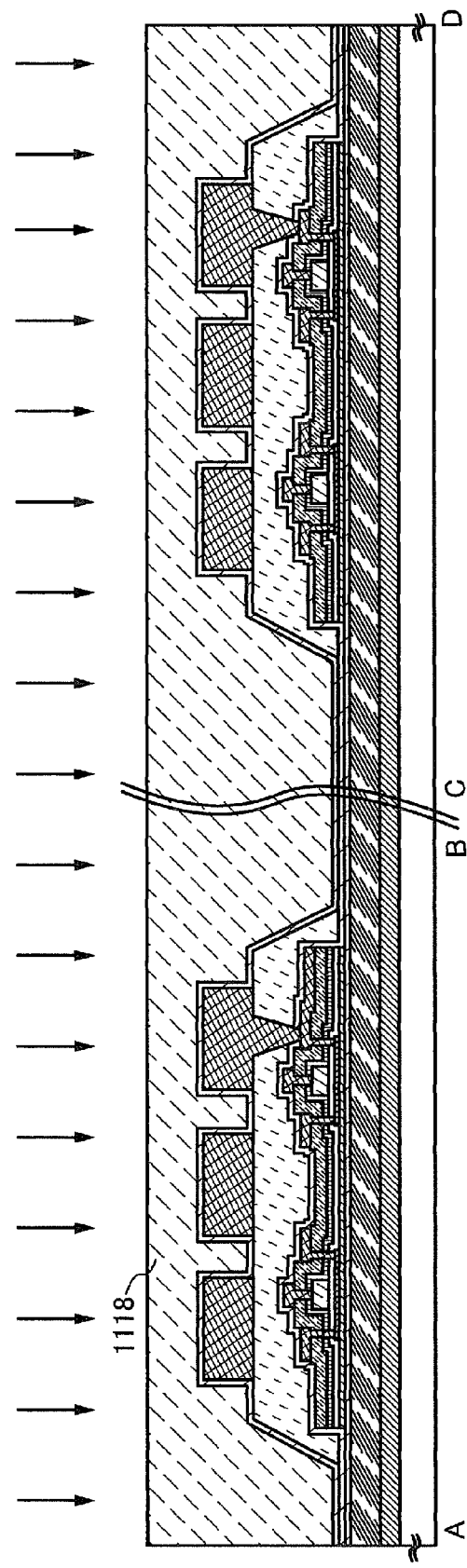

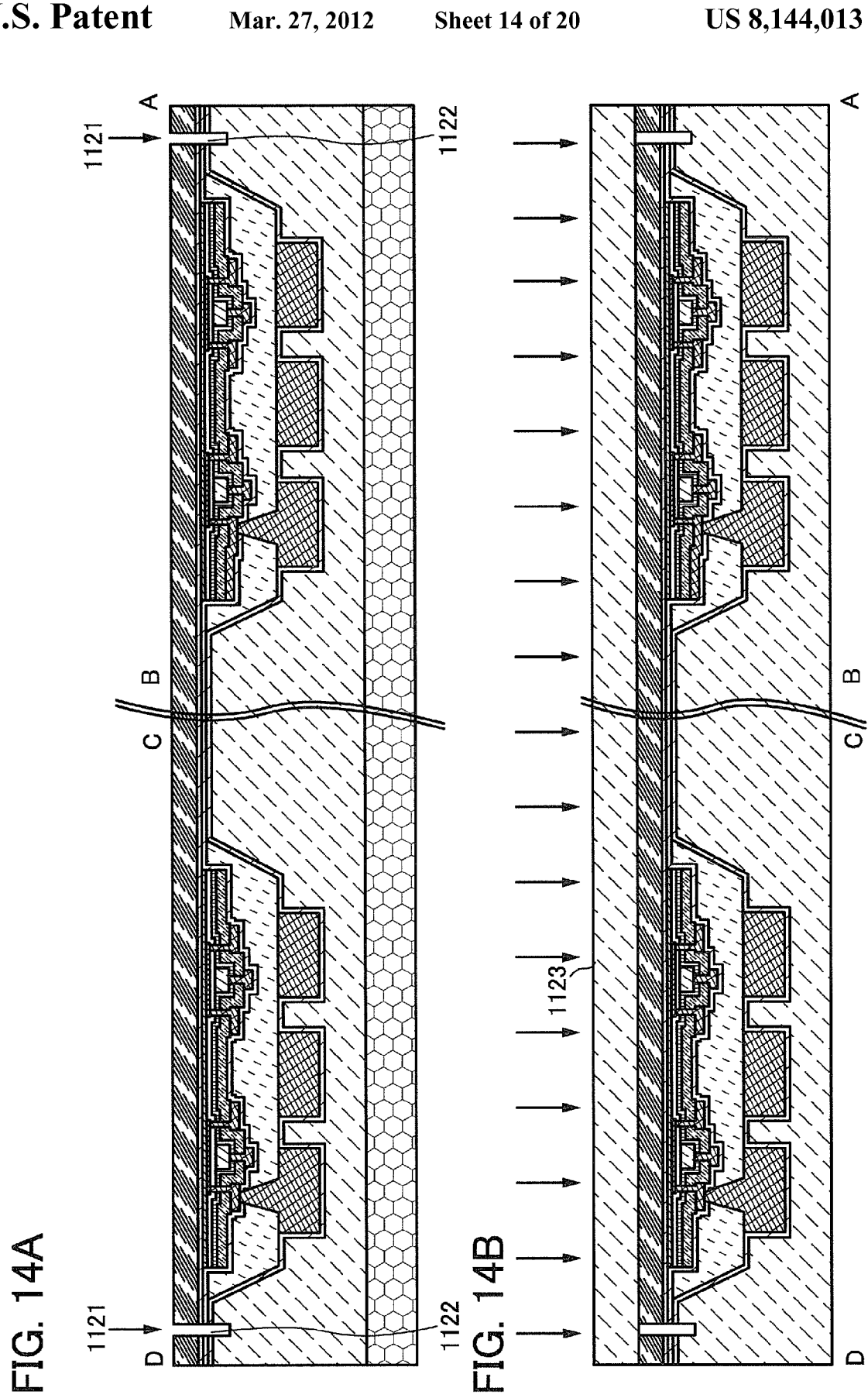

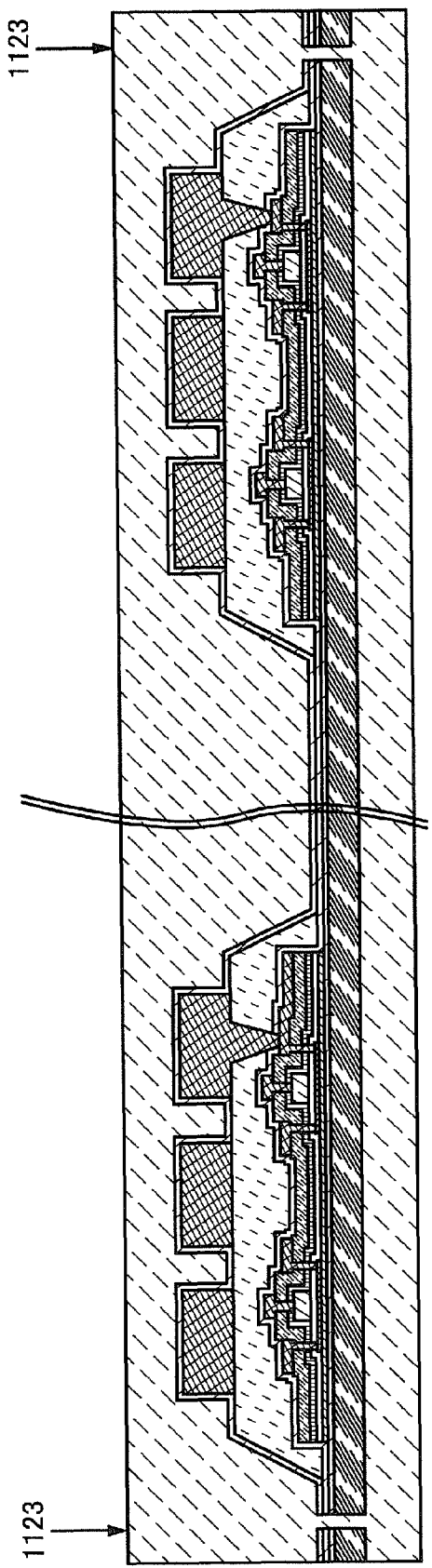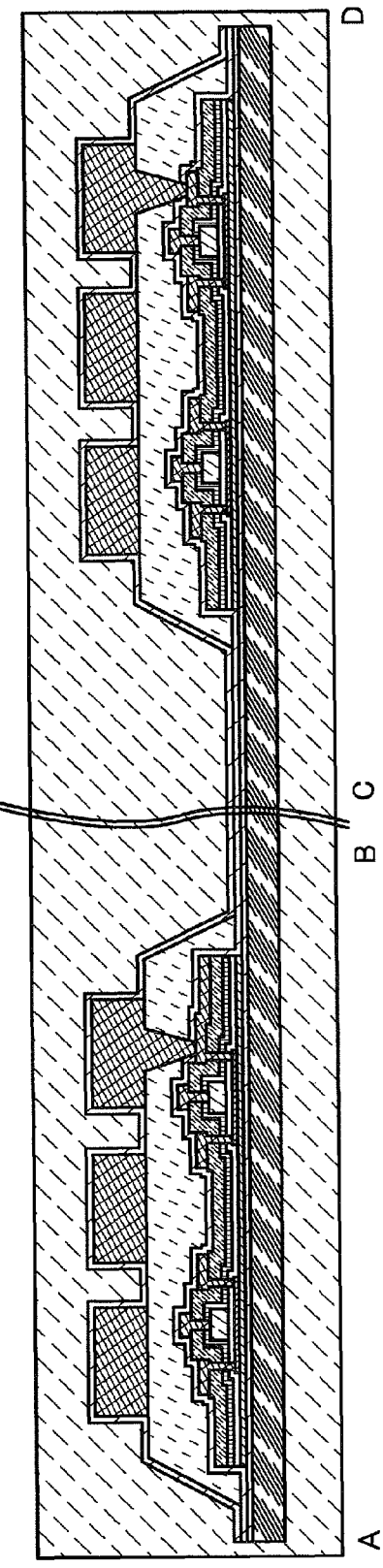

SEMICONDUCTOR DEVICE

BACKGROUND OF THE INVENTION

1. Field of the Invention

The present invention relates to a semiconductor device. In particular, the present invention relates to a semiconductor device capable of communicating data wirelessly, a so-called IC chip (also referred to as an ID chip and a transponder) for RFID (radio frequency identification).

Note that the semiconductor device herein refers to all devices which can function by utilizing the semiconductor characteristics.

2. Description of the Related Art

In recent years, environment where it is possible to access an information network anytime and anywhere, which is called ubiquitous information society, has been developed. In such environment, an individual identification technique in which an ID (individual identification number) is given to an individual object to clarify records of the object so that it is useful for production, management, and the like has been developed for practical use. In particular, semiconductor devices which utilize an RFID (radio frequency identification) technique and perform wireless data communication with external communication devices (hereinafter referred to as communication devices, and also referred to as reader/writers, controllers, and interrogators) have been widely spread and put into practical use. Such semiconductor devices are hereinafter simply referred to as semiconductor devices and also referred to as ID chips, IC chips, and transponders.

In order to promote the spread of the semiconductor device, it is important to improve the reliability of the semiconductor device. Patent Document 1 (Japanese Published Patent Application No. 2002-83277) discloses a structure in which a semiconductor device including one antenna is provided with two semiconductor integrated circuits in order to improve the reliability of the semiconductor device.

SUMMARY OF THE INVENTION

According to Patent Document 1, the reliability of the semiconductor device can be improved; however, when both of the two semiconductor integrated circuits are not destroyed and are capable of operating, two semiconductor integrated circuits operate. Accordingly, power consumption of the semiconductor device is increased as the number of semiconductor integrated circuits is increased. A wireless signal is transmitted from a communication device to a semiconductor device, and power received by an antenna of the semiconductor device is limited by Radio Law or the like.

In view of the foregoing problems, the present invention provides a semiconductor device with improved reliability, in which increase in power consumption can be reduced.

One feature of the present invention is a semiconductor device which includes an antenna for transmitting and receiving a wireless signal to/from a communication device; and a plurality of functional circuits electrically connected to the antenna. The semiconductor device transmits and receives the wireless signal to/from the communication device by operating one functional circuit among the plurality of functional circuits.

Another feature of the present invention is a semiconductor device which includes an antenna for transmitting and receiving a wireless signal to/from a communication device; and at least first and second functional circuits electrically connected to the antenna. The first functional circuit includes a power supply control circuit for controlling power supply voltage output from a power supply circuit in the second functional circuit.

Another feature of the present invention is a semiconductor device which includes an antenna for transmitting and receiving a wireless signal to/from a communication device; and at least first and second functional circuits electrically connected to the antenna. The first functional circuit includes a power supply control circuit for controlling power supply voltage output from a power supply circuit in the second functional circuits. A power supply control circuit in the second functional circuits includes a transistor. A first terminal of the transistor is electrically connected to an output terminal of the power supply circuit and a second terminal of the transistor is electrically connected to a ground line. A gate terminal of the transistor is electrically connected to the power supply control circuit included in one functional circuit.

Another feature of the present invention is a semiconductor device which includes an antenna for transmitting and receiving a wireless signal to/from a communication device; and first to fourth functional circuits electrically connected to the antenna. The first functional circuit includes a power supply control circuit for controlling power supply voltage output from power supply circuits in the second to fourth functional circuits. The second functional circuit includes a power supply control circuit for controlling power supply voltage output from the power supply circuits in the third and fourth functional circuits. The third functional circuit includes a power supply control circuit for controlling power supply voltage output from the power supply circuit in the fourth functional circuit.

Still another feature of the present invention is a semiconductor device which includes an antenna for transmitting and receiving a wireless signal to/from a communication device; and at least first and second functional circuits electrically connected to the antenna. A first functional circuit includes a determination circuit for outputting a determination signal depending on an error of an output of a logic circuit; a power supply circuit for supplying power supply voltage to the logic circuit; and a power supply control circuit for controlling power supply voltage output from a power supply circuit in the second functional circuit based on operations of the determination circuit and the power supply circuit. A power supply control circuit in the second functional circuit includes a transistor. A first terminal of the transistor is electrically connected to an output terminal of the power supply circuit and a second terminal of the transistor is electrically connected to a ground line. A gate terminal of the transistor is electrically connected to the power supply control circuit included in one functional circuit.

Still another feature of the present invention is a semiconductor device which includes an antenna for transmitting and receiving a wireless signal to/from a communication device; and first to fourth functional circuits electrically connected to the antenna. The first functional circuit includes a determination circuit for outputting a determination signal depending on an error of an output of a logic circuit; a power supply circuit for supplying power supply voltage to the logic circuit; and a power supply control circuit for controlling power supply voltage output from power supply circuits in the second to fourth functional circuits based on operations of the determination circuit and the power supply circuit. The second functional circuit includes a power supply control circuit for controlling power supply voltage output from the power supply circuits in the third and fourth functional circuits based on operations of a determination circuit and a power supply circuit included in the second functional circuit. The third functional circuit includes a power supply control circuit for controlling power supply voltage output from the power supply circuit in the fourth functional circuit based on operations of the determination circuit and the power supply circuit included in the third functional circuit.

In the semiconductor device, the determination circuit may include a nonvolatile memory element.

In addition, writing to the nonvolatile memory element can be performed only once.

Each of the plurality of functional circuits and the first to fourth functional circuits includes a thin film transistor.

The antenna and the functional circuits may be covered with a sealing layer.

The sealing layer may include a fiber layer and an organic resin layer.

The functional circuits may be provided to overlap with the antenna.

In the present invention, even when external force or impact is applied to a semiconductor device including a plurality of functional circuits, the semiconductor device can transmit and receive wireless signals to/from a communication device. Accordingly, a semiconductor device with high reliability can be provided. In addition, a semiconductor device of the present invention can be operated while a function of a functional circuit which does not transmit and receive wireless signals to/from the communication device is suspended. Accordingly, the communication distance between the communication device and the semiconductor device can be increased, and power consumption can be reduced.

BRIEF DESCRIPTION OF THE DRAWINGS

In the accompanying drawings:
FIGS. 11A to 11C illustrate Embodiment Mode 4;
FIGS. 12A and 12B illustrate Embodiment Mode 4;
FIGS. 14A and 14B illustrate Embodiment Mode 4;
FIGS. 15A and 15B illustrate Embodiment Mode 4.

DETAILED DESCRIPTION OF THE INVENTION

Embodiment modes of the present invention will be hereinafter described with reference to the accompanying drawings. Note that the present invention can be implemented in various modes, and it is easily understood by those skilled in the art that modes and details can be variously changed without departing from the spirit and the scope of the present invention. Therefore, the present invention is not construed as being limited to the description of the embodiment modes.

Embodiment Mode 1

Figure 1:
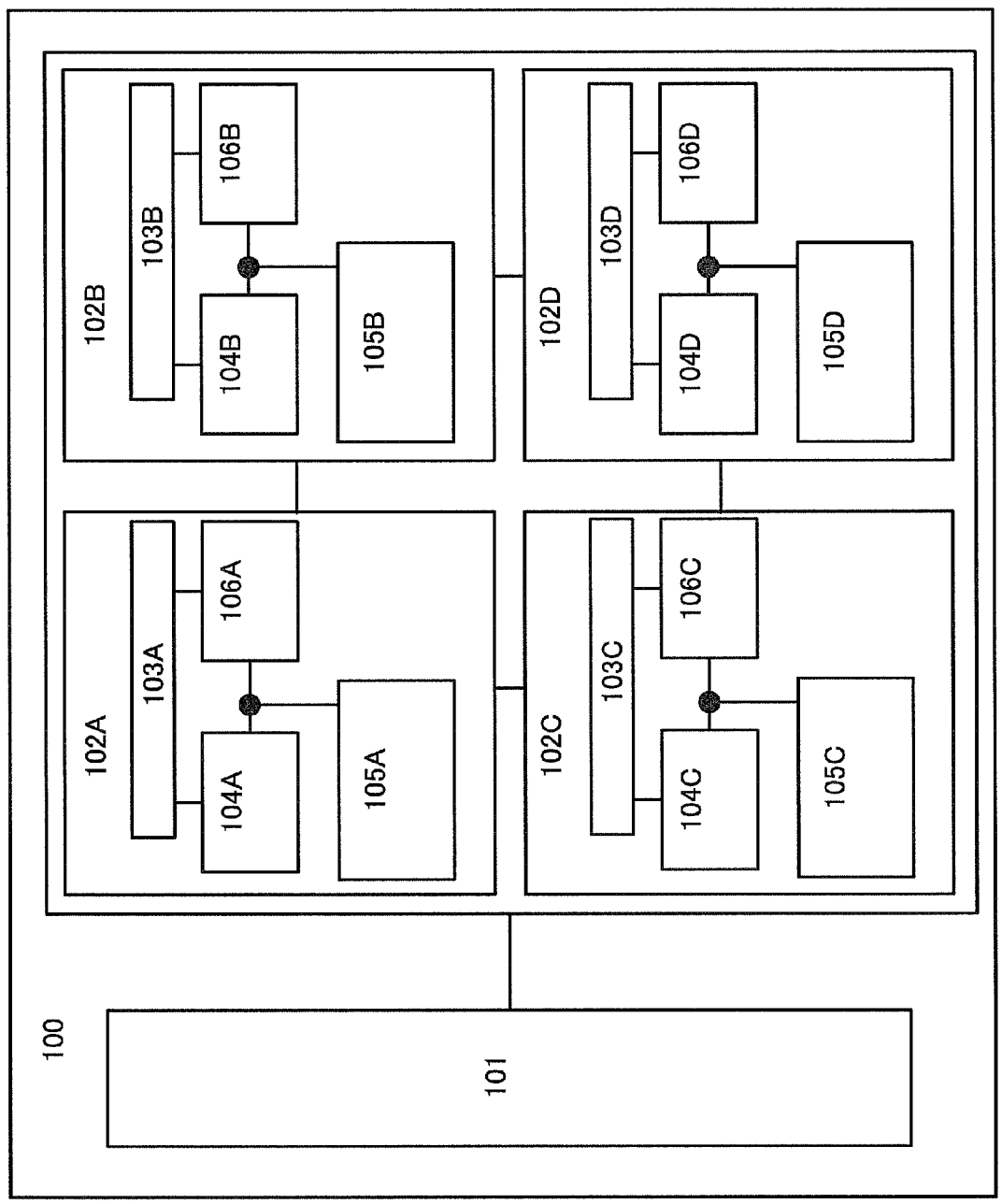
FIG. 1 illustrates Embodiment Mode 1.

A structure of a semiconductor device of the present invention is described with reference to FIG. 1. FIG. 1 is a block diagram illustrating a semiconductor device of the present invention. A semiconductor device 100 of the present invention includes an antenna 101, a first functional circuit 102A, a second functional circuit 102B, a third functional circuit 102C, and a fourth functional circuit 102D. The first functional circuit 102A includes a transmission/reception circuit 103A, a power supply circuit 104A, a power supply control circuit 105A, and a logic circuit 106A. The second functional circuit 102B includes a transmission/reception circuit 103B, a power supply circuit 104B, a power supply control circuit 105B, and a logic circuit 106B. The third functional circuit 102C includes a transmission/reception circuit 103C, a power supply circuit 104C, a power supply control circuit 105C, and a logic circuit 106C. The fourth functional circuit 102D includes a transmission/reception circuit 103D, a power supply circuit 104D, a power supply control circuit 105D, and a logic circuit 106D. Note that the antenna 101 is electrically connected to the first functional circuit 102A, the second functional circuit 102B, the third functional circuit 102C, and the fourth functional circuit 102D.

Note that terms such as first, second, third to N-th (N is a natural number) in this specification are used in order to avoid confusion between components and do not limit the number.

In the block diagram illustrated in FIG. 1, the antenna 101 receives wireless signals of electromagnetic waves from a communication device (not shown) which is provided outside, and transmits signals to the communication device.

Note that in FIG. 1, there is no particular limitation on the shape of the antenna 101. That is, a signal transmission method applied to the antenna 101 in the semiconductor device 100 may be selected as appropriate in consideration of intended use by a practitioner, and an antenna with a length and a shape which are suitable for the transmission method may be provided.

For example, when an electromagnetic induction system (e.g., the 13.56 MHz band) is employed as the transmission method, electromagnetic induction caused by change in electric field density is used. Therefore, a conductive film functioning as an antenna is formed in an annular shape (e.g., a loop antenna) or a spiral shape (e.g., a spiral antenna).

Further, when a microwave method (e.g., the UHF band (860 to 960 MHz band) or the 2.45 GHz band) is employed as the transmission method, the shape and the length of the conductive film functioning as the antenna may be set as appropriate in consideration of a wavelength of an electromagnetic wave used for signal transmission. For example, a conductive film functioning as an antenna can be formed in a linear shape (e.g., a dipole antenna), a flat shape (e.g., a patch antenna), or the like. Moreover, the shape of the conductive film functioning as the antenna is not limited to a linear shape and may be provided in a curved shape, a meander shape, or a combination thereof in consideration of a wavelength of an electromagnetic wave.

Next, the first functional circuit 102A to the fourth functional circuit 102D are described. Note that in this embodiment mode, a specific example where four functional circuits are used is described for simple explanation; however, there is no particular limitation on the number of functional circuits in the present invention. The present invention can be applied to a semiconductor device with a structure including two or more functional circuits.

As illustrated in FIG. 1, the first functional circuit 102A to the fourth functional circuit 102D in this embodiment mode include the transmission/reception circuits 103A to 103D, the power supply circuits 104A to 104D, the power supply control circuits 105A to 105D, and the logic circuits 106A to 106D, respectively.

Note that a functional circuit described in this specification has a function of transmitting and receiving data using wireless signals to/from a communication device. A transmission/reception circuit has functions of demodulating a signal received by an antenna, modulating a signal to be transmitted to the antenna, rectifying and smoothing an alternating current signal output from the antenna. A power supply circuit is a circuit for generating and outputting the power supply potential for operating a logic circuit based on a direct current signal generated in the transmission/reception circuit. A logic circuit includes a circuit for extracting a plurality of codes contained in a command transmitted to the logic circuit; a circuit for comparing the extracted code and a code corresponding to the reference so as to determine the contents of the command; a circuit for detecting the presence of a transmission error or the like based on the determined code; and a circuit for encoding and outputting a signal output from the logic circuit. Moreover, the logic circuit includes a memory circuit in which an ID (identification) code, which is different among functional circuits, is stored.

Next, circuit structures of the first functional circuit 102A to the fourth functional circuit 102D in the semiconductor device of the present invention are shown, and the present invention is described in detail.

Figure 2:
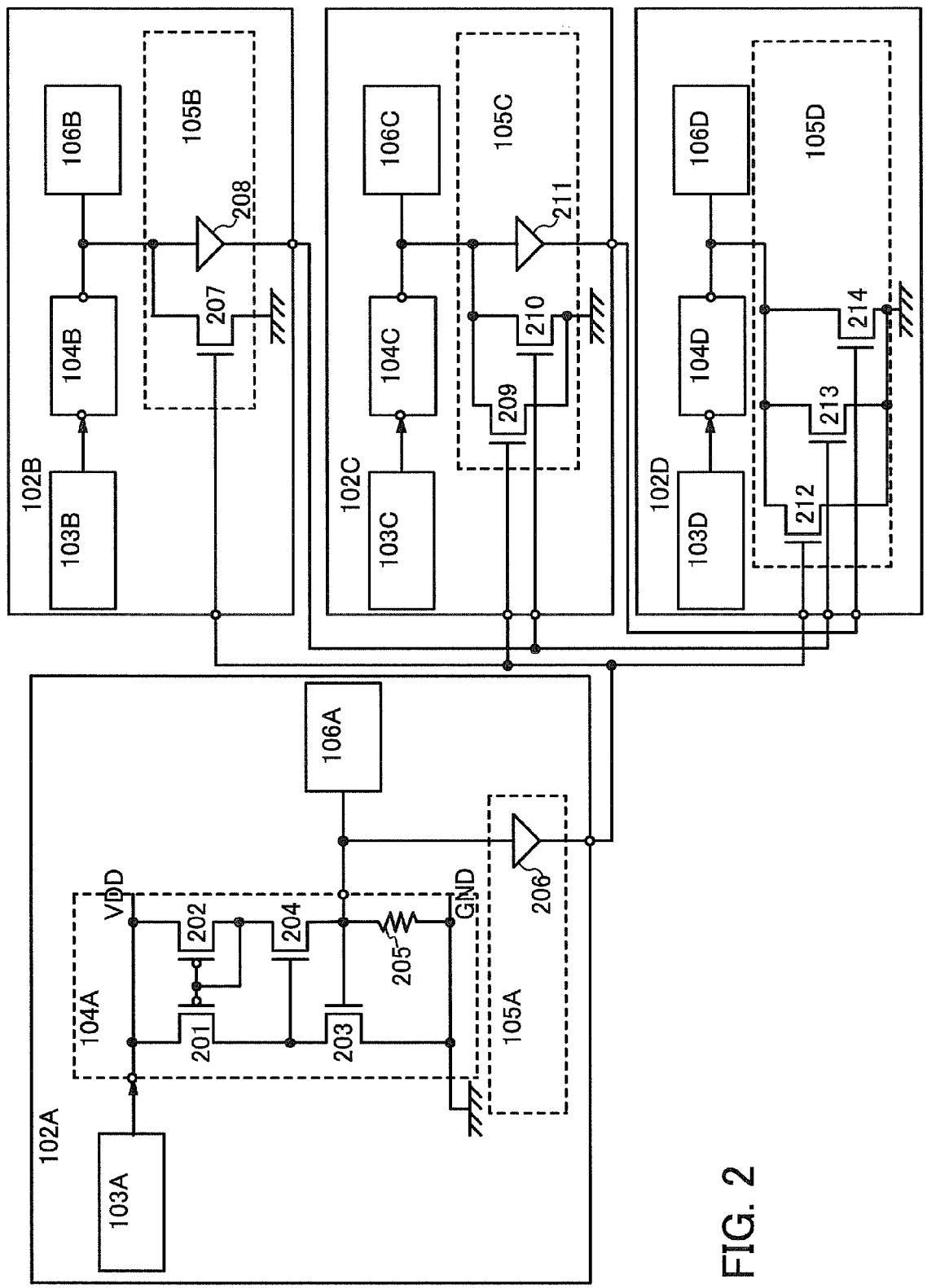
FIG. 2 illustrates Embodiment Mode 1.

FIG. 2 illustrates part of the circuit structures in the block diagram of the first functional circuit 102A to the fourth functional circuit 102D shown in FIG. 1. In the first functional circuit 102A illustrated in FIG. 2, a direct current signal output from the transmission/reception circuit is input to the power supply circuit 104A. As a circuit for generating the power supply potential for operating the logic circuit 106A, FIG. 2 illustrates the power supply circuit 104A including a p-channel transistor 201, a p-channel transistor 202, an n-channel transistor 203, an n-channel transistor 204, and a resistor 205 as an example. Note that the circuit structure of the power supply circuit 104A illustrated in FIG. 2 is an example, and the present invention is not limited to this circuit structure.

In the power supply circuit 104A illustrated in FIG. 2, a first terminal of the p-channel transistor 201 and a first terminal of the p-channel transistor 202 are electrically connected to a high potential line VDD. Gate terminals of the p-channel transistors 201 and 202 are electrically connected to each other. A second terminal of the p-channel transistor 201 is electrically connected to a first terminal of the n-channel transistor 203 and a gate terminal of the n-channel transistor 204. A second terminal of the p-channel transistor 202 is electrically connected to the gate terminal of the p-channel transistor 202 and a first terminal of the n-channel transistor 204. Moreover, a gate terminal of the n-channel transistor 203 is electrically connected to a second terminal of the n-channel transistor 204, one terminal of the resistor 205, and an output terminal of the power supply circuit 104A. A second terminal of the n-channel transistor 203 is electrically connected to the other terminal of the resistor 205 and a ground line (GND). The output terminal of the power supply circuit 104A is electrically connected to the power supply control circuit 105A and the logic circuit 106A.

Note that like the p-channel transistors 201 and 202 and the n-channel transistors 203 and 204 which are shown in FIG. 2 as an example, a transistor is an element having at least three terminals of a gate, a drain, and a source. The transistor includes a channel region between a drain region and a source region, and current can flow through the drain region, the channel region, and the source region. Here, since the source and the drain of the transistor change depending on the structure, the operating condition, and the like of the transistor, it is difficult to define which is a source or a drain. Therefore, in this embodiment mode, terminals which function as a source and a drain are referred to as a first terminal and a second terminal as an example. Further, a terminal functioning as a gate is referred to as a gate terminal.

Note that in this specification, the state where A and B are connected includes the state where A and B are electrically connected. In addition, the case where A and B are electrically connected includes the case where an object which acts electrically is provided between A and B.

Next, the power supply control circuit 105A in the first functional circuit 102A illustrated in FIG. 2 is described. To the power supply control circuit 105A, a high potential signal (also referred to as an H-level signal) is input from the power supply circuit 104A. Alternatively, when the transmission/reception circuit 103A and the power supply circuit 104A are destroyed by external force or impact, a signal having the same potential as the ground line (also referred to as an L-level signal) is input to the power supply control circuit 105A. The power supply control circuit 105A includes a buffer circuit 206 for improving driving capability of externally outputting an H-level signal or an L-level signal. That is, in the power supply control circuit 105A, the buffer circuit 206 outputs an H-level signal when the transmission/reception circuit 103A and the power supply circuit 104A are normally operated, whereas the buffer circuit 206 outputs an L-level signal when the transmission/reception circuit 103A and the power supply circuit 104A are destroyed by external force or impact.

Note that in this specification, the polarity of transistors and signals output from each circuit is specified for explanation. Therefore, there is no particular limitation on the H-level and L-level of signals and the polarity of transistors as long as a structure with an equivalent function to the present invention described below can be realized.

Next, the structure of the power supply control circuit 105B in the second functional circuit 102B illustrated in FIG. 2 is described. Note that the description of the transmission/reception circuit 103B, the power supply circuit 104B, and the logic circuit 106B is similar to the description of the transmission/reception circuit 103A, the power supply circuit 104A, and the logic circuit 106A in the first functional circuit 102A.

As in the first functional circuit 102A, to the power supply control circuit 105B in the second functional circuit 102B, an H-level signal is input from the power supply circuit 104B, or alternatively an L-level signal is input when the transmission/reception circuit 103B and the power supply circuit 104B are destroyed by external force or impact. The power supply control circuit 105B in the second functional circuit 102B includes an n-channel transistor 207 and a buffer circuit 208. The buffer circuit 208 is a circuit for improving driving capability of externally outputting an H-level signal or an L-level signal which is input, like the buffer circuit 206. A first terminal of the n-channel transistor 207 is electrically connected to an output terminal of the power supply circuit 104B. A gate terminal of the n-channel transistor 207 is electrically connected to an output terminal of the buffer circuit 206 in the power supply control circuit 105A of the first functional circuit 102A. A second terminal of the n-channel transistor 207 is electrically connected to the ground line.

Next, the structure of the power supply control circuit 105C in the third functional circuit 102C illustrated in FIG. 2 is described. Note that the description of the transmission/reception circuit 103C, the power supply circuit 104C, and the logic circuit 106C is similar to the description of the transmission/reception circuit 103A, the power supply circuit 104A, and the logic circuit 106A in the first functional circuit 102A.

As in the first functional circuit 102A, to the power supply control circuit 105C in the third functional circuit 102C, an H-level signal is input from the power supply circuit 104C, or alternatively an L-level signal is input when the transmission/reception circuit 103C and the power supply circuit 104C are destroyed by external force or impact. The power supply control circuit 105C in the third functional circuit 102C includes an n-channel transistor 209, an n-channel transistor 210, and a buffer circuit 211. The buffer circuit 211 is a circuit for improving driving capability of externally outputting an H-level signal or an L-level signal which is input, like the buffer circuit 206. A first terminal of the n-channel transistor 209 is electrically connected to an output terminal of the power supply circuit 104C. A gate terminal of the n-channel transistor 209 is electrically connected to the output terminal of the buffer circuit 206 in the power supply control circuit 105A of the first functional circuit 102A. A second terminal of the n-channel transistor 209 is electrically connected to the ground line. A first terminal of the n-channel transistor 210 is electrically connected to the output terminal of the power supply circuit 104C. A gate terminal of the n-channel transistor 210 is electrically connected to an output terminal of the buffer circuit 208 in the power supply control circuit 105B of the second functional circuit 102B. A second terminal of the n-channel transistor 210 is electrically connected to the ground line.

Next, the structure of the power supply control circuit 105D in the fourth functional circuit 102D illustrated in FIG. 2 is described. Note that the description of the transmission/reception circuit 103D, the power supply circuit 104D, and the logic circuit 106D is similar to the description of the transmission/reception circuit 103A, the power supply circuit 104A, and the logic circuit 106A in the first functional circuit 102A.

As in the first functional circuit 102A, to the power supply control circuit 105D in the fourth functional circuit 102D, an H-level signal is input from the power supply circuit 104D, or alternatively an L-level signal is input when the transmission/reception circuit 103D and the power supply circuit 104D are destroyed by external force or impact. The power supply control circuit 105D in the fourth functional circuit 102D includes n-channel transistors 212, 213, and 214. A first terminal of the n-channel transistor 212 is electrically connected to an output terminal of the power supply circuit 104D. A gate terminal of the n-channel transistor 212 is electrically connected to the output terminal of the buffer circuit 206 in the power supply control circuit 105A of the first functional circuit 102A. A second terminal of the n-channel transistor 212 is electrically connected to the ground line. A first terminal of the n-channel transistor 213 is electrically connected to the output terminal of the power supply circuit 104D. A gate terminal of the n-channel transistor 213 is electrically connected to the output terminal of the buffer circuit 208 in the power supply control circuit 105B of the second functional circuit 102B. A second terminal of the n-channel transistor 213 is electrically connected to the ground line. A first terminal of the n-channel transistor 214 is electrically connected to the output terminal of the power supply circuit 104D. A gate terminal of the n-channel transistor 214 is electrically connected to an output terminal of the buffer circuit 211 in the power supply control circuit 105C of the third functional circuit 102C. A second terminal of the n-channel transistor 214 is electrically connected to the ground line.

Note that the power supply control circuits in the first functional circuit 102A to the fourth functional circuit 102D illustrated in FIG. 2 have different structures from each other. Here, considering a structure in which a semiconductor device includes first to N-th functional circuits (N is a natural number of 3 or more), a power supply control circuit in the first functional circuit includes one buffer circuit which is connected to an output terminal of a power supply circuit. A power supply control circuit in the i-th functional circuit (i is a natural number of 2 or more and less than N) includes (i−1) n-channel transistors and one buffer circuit. A power supply control circuit in the N-th functional circuit includes (N−1) n-channel transistors. In addition, connection of the n-channel transistors and the buffer circuits to the power supply circuits or the like can be the connection illustrated in FIG. 2.

Note that when a semiconductor device only includes a first functional circuit and a second functional circuit, a power supply control circuit in the first functional circuit includes one buffer circuit which is connected to an output terminal of a power supply circuit, and a power supply control circuit in the second functional circuit includes one n-channel transistor. In addition, connection of the n-channel transistor and the buffer circuit to the power supply circuit or the like can be the connection illustrated in FIG. 2.

Operations of the first functional circuit 102A to the fourth functional circuit 102D in the semiconductor device illustrated in FIG. 2 are described with reference to flow charts illustrated in FIG. 3 and FIG. 4.

Figure 3:
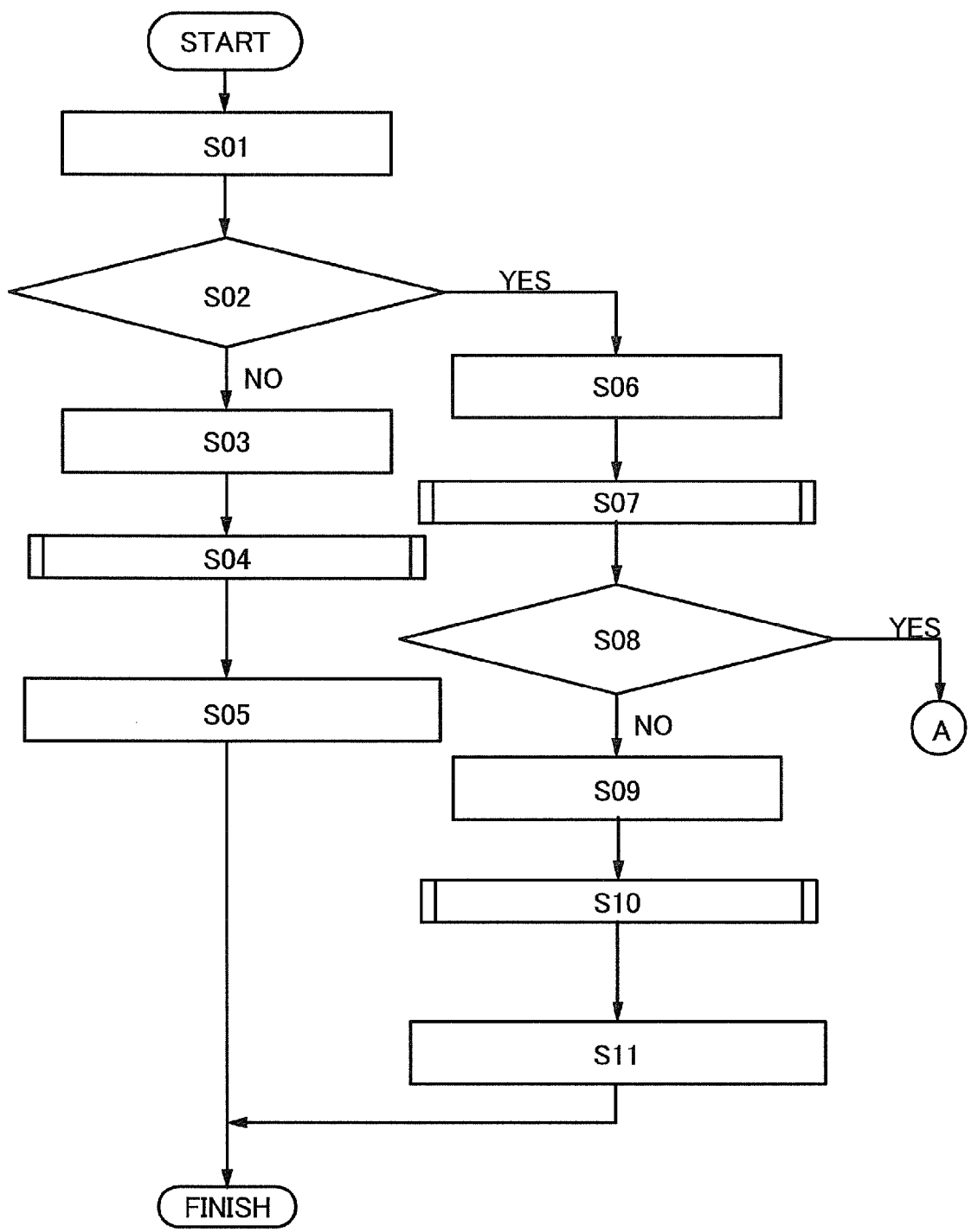
FIG. 3 illustrates Embodiment Mode 1.

First, in the semiconductor device 100, a wireless signal is transmitted from a communication device to the antenna 101, and an alternating current signal is generated from the wireless signal and input to the transmission/reception circuits 103A to 103D in the first functional circuit 102A to the fourth functional circuit 102D (Step S01 in FIG. 3). Since the antenna 101 is electrically connected to the transmission/reception circuits 103A to 103D in the first functional circuit 102A to the fourth functional circuit 102D, an alternating current signal is equally input to the first functional circuit 102A to the fourth functional circuit 102D.

Next, a direct current signal is input from the transmission/reception circuit 103A in the first functional circuit 102A to the power supply circuit 104A. At this time, whether a malfunction occurs in the power supply circuit 104A of the first functional circuit 102A is determined (Step S02 in FIG. 3). Note that at this time, a malfunction in the transmission/reception circuit 103A as well as the malfunction in the power supply circuit 104A is judged in Step S02.

When there is no malfunction in the power supply circuit 104A of the first functional circuit 102A in Step S02, the power supply circuit 104A outputs an H-level signal. Accordingly, the power supply control circuit 105A in the first functional circuit 102A outputs an H-level signal from the buffer circuit 206 (Step S03 in FIG. 3).

As illustrated in FIG. 2, the output terminal of the buffer circuit 206 in the power supply control circuit 105A of the first functional circuit 102A is electrically connected to the power supply control circuits 105B to 105D in the second functional circuit 102B to the fourth functional circuit 102D, and processing is performed in the second functional circuit 102B to the fourth functional circuit 102D depending on the output of the buffer circuit 206 (Step S04 in FIG. 3). Specifically, the processing in Step S04 is processing for turning on the n-channel transistors 207, 209, and 212.

By the processing in Step S04, the power supply potential is supplied to the logic circuit 106A in the first functional circuit 102A, so that the first functional circuit 102A is operated. On the other hand, the power supply control circuits 105B to 105D in the second functional circuit 102B to the fourth functional circuit 102D allow electrical continuity between the output terminals of the power supply circuits 104B to 104D and the ground line, whereby the power supply potential is not supplied to the logic circuits 106B to 106D, and the second functional circuit 102B to the fourth functional circuit 102D are not operated (Step S05 in FIG. 3). That is, in the semiconductor device, the first functional circuit 102A can be used by itself as the functional circuit which transmits and receives wireless signals to/from a communication device, and power received by the antenna 101 can be efficiently used. Accordingly, reduction in power consumption can be achieved.

The process returns to Step S02. When there is a malfunction in the power supply circuit 104A of the first functional circuit 102A in Step S02, the power supply potential cannot be generated, and the power supply circuit 104A outputs an L-level signal. Accordingly, the power supply control circuit 105A in the first functional circuit 102A outputs an L-level signal from the buffer circuit 206 (Step S06 in FIG. 3).

As illustrated in FIG. 2, the output terminal of the buffer circuit 206 in the power supply control circuit 105A of the first functional circuit 102A is electrically connected to the power supply control circuits 105B to 105D in the second functional circuit 102B to the fourth functional circuit 102D, and processing is performed in the second functional circuit 102B to the fourth functional circuit 102D depending on the output of the buffer circuit 206 (Step S07 in FIG. 3). Specifically, the processing in Step S07 is processing for turning off the n-channel transistors 207, 209, and 212.

When the power supply circuit in the first functional circuit 102A malfunctions, the power supply potential is not supplied to the logic circuit, and the first functional circuit 102A is not operated. On the other hand, the power supply control circuits 105B to 105D in the second functional circuit 102B to the fourth functional circuit 102D do not allow electrical continuity between the output terminals of the power supply circuits 104B to 104D and the ground line. That is, Step S07 is a step for selecting one of the second functional circuit 102B to the fourth functional circuit 102D except the first functional circuit 102A, in which a malfunction occurs, as the functional circuit which transmits and receives wireless signals to/from a communication device.

Next, whether a malfunction occurs in the power supply circuit 104B of the second functional circuit 102B is determined (Step S08 in FIG. 3) when a direct current signal is input from the transmission/reception circuit 103B in the second functional circuit 102B to the power supply circuit 104B. Note that at this time, a malfunction in the transmission/reception circuit 103B as well as the malfunction in the power supply circuit 104B is judged.

When there is no malfunction in the power supply circuit 104B of the second functional circuit 102B in Step S08, the power supply circuit 104B outputs an H-level signal. Accordingly, the power supply control circuit 105B in the second functional circuit 102B outputs an H-level signal from the buffer circuit 208 (Step S09 in FIG. 3).

As illustrated in FIG. 2, the output terminal of the buffer circuit 208 in the power supply control circuit 105B of the second functional circuit 102B is electrically connected to the power supply control circuits 105C and 105D in the third functional circuit 102C and the fourth functional circuit 102D, and processing is performed in the third functional circuit 102C and the fourth functional circuit 102D depending on the output of the buffer circuit 208 (Step S10 in FIG. 3). Specifically, the processing in Step S10 is processing for turning on the n-channel transistors 210 and 213.

By the processing in Step S10, the power supply potential is supplied to the logic circuit 106B in the second functional circuit 102B, so that the second functional circuit 102B is operated. On the other hand, the power supply control circuits 105C and 105D in the third functional circuit 102C and the fourth functional circuit 102D allow electrical continuity between the output terminals of the power supply circuits and the ground line, whereby the power supply potential is not supplied to the logic circuit 106C, and the third functional circuit 102C and the fourth functional circuit 102D are not operated (Step S11 in FIG. 3). That is, in the semiconductor device, the second functional circuit 102B can be used by itself as the functional circuit which transmits and receives wireless signals to/from a communication device, and power received by the antenna 101 can be efficiently used. Accordingly, reduction in power consumption can be achieved.

The process returns to Step S08. When there is a malfunction in the power supply circuit 104B of the second functional circuit 102B in Step S08 (A in FIG. 3 and FIG. 4), the power supply potential cannot be generated, and the power supply circuit 104B outputs an L-level signal. Accordingly, the power supply control circuit 105B in the second functional circuit 102B outputs an L-level signal from the buffer circuit 208 (Step S12 in FIG. 4).

Figure 4:
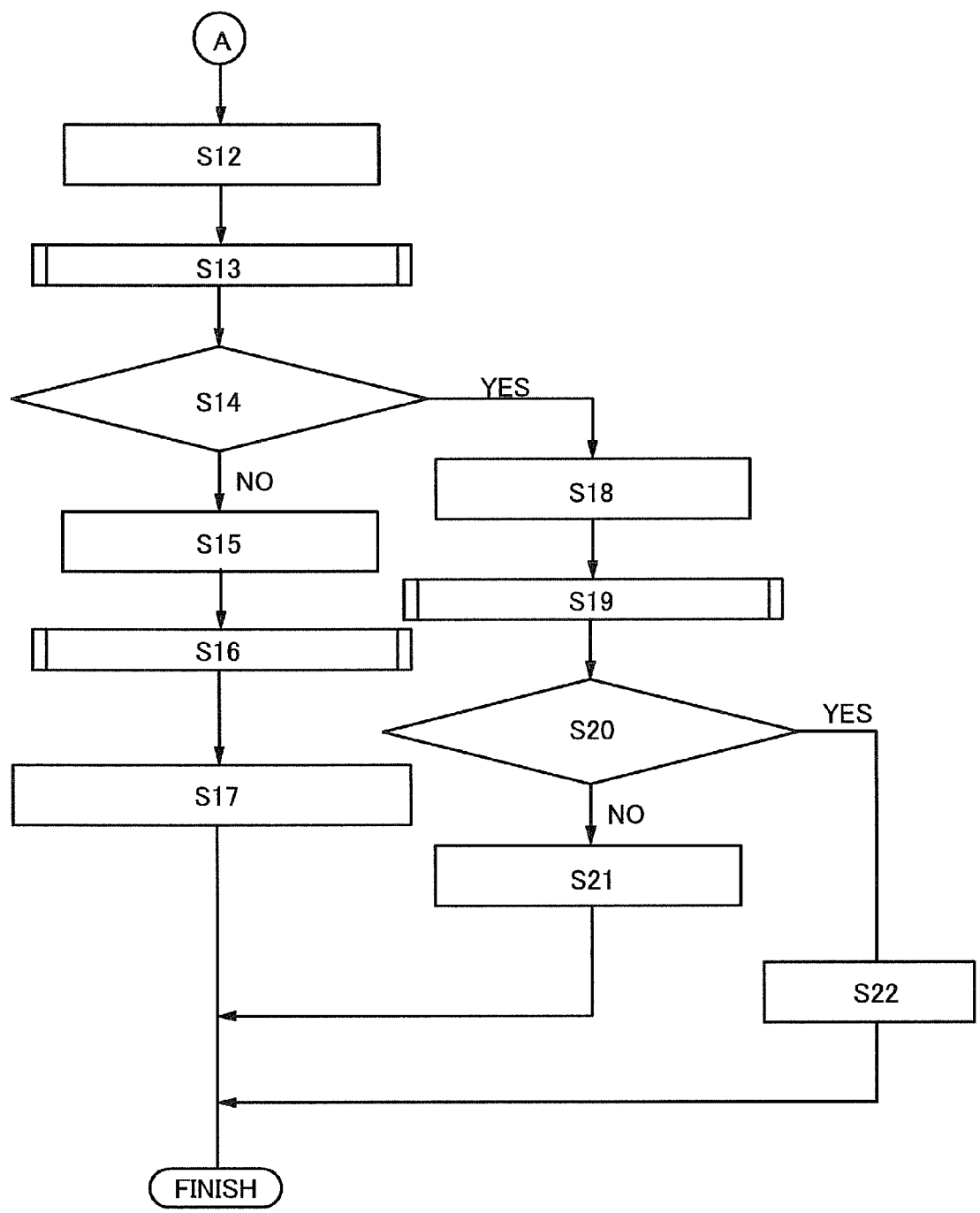
FIG. 4 illustrates Embodiment Mode 1.

As illustrated in FIG. 2, the output terminal of the buffer circuit 208 in the power supply control circuit 105B of the second functional circuit 102B is electrically connected to the power supply control circuits 105C and 105D in the third functional circuit 102C and the fourth functional circuit 102D, and processing is performed in the third functional circuit 102C and the fourth functional circuit 102D depending on the output of the buffer circuit 208 (Step S13 in FIG. 4). Specifically, the processing in Step S13 is processing for turning off the n-channel transistors 210 and 213.

When the power supply circuit 104B in the second functional circuit 102B malfunctions, the power supply potential is not supplied to the logic circuit 106B, and the second functional circuit 102B is not operated. On the other hand, the power supply control circuits 105C and 105D in the third functional circuit 102C and the fourth functional circuit 102D do not allow electrical continuity between the output terminals of the power supply circuits 104C and 104D and the ground line. That is, Step S13 is a step for selecting one of the third functional circuit 102C and the fourth functional circuit 102D except the first functional circuit 102A and the second functional circuit 102B, in which a malfunction occurs, as the functional circuit which transmits and receives wireless signals to/from a communication device.

Next, whether a malfunction occurs in the power supply circuit 104C of the third functional circuit 102C is determined (Step S14 in FIG. 4) when a direct current signal is input from the transmission/reception circuit 103C in the third functional circuit 102C to the power supply circuit 104C. Note that at this time, a malfunction in the transmission/reception circuit 103C as well as the malfunction in the power supply circuit 104C is judged.

When there is no malfunction in the power supply circuit 104C of the third functional circuit 102C in Step S14, the power supply circuit 104C outputs an H-level signal. Accordingly, the power supply control circuit 105C in the third functional circuit 102C outputs an H-level signal from the buffer circuit 211 (Step S15 in FIG. 4).

As illustrated in FIG. 2, the output terminal of the buffer circuit 211 in the power supply control circuit 105C of the third functional circuit 102C is electrically connected to the power supply control circuit 105D in the fourth functional circuit 102D, and processing is performed in the fourth functional circuit 102D depending on the output of the buffer circuit 211 (Step S16 in FIG. 4). Specifically, the processing in Step S16 is processing for turning on the n-channel transistor 214.

By the processing in Step S16, the power supply potential is supplied to the logic circuit 106C in the third functional circuit 102C. On the other hand, the power supply control circuit 105D in the fourth functional circuit 102D allows electrical continuity between the output terminal of the power supply circuit 104D and the ground line, whereby the power supply potential is not supplied to the logic circuit 106D, and the fourth functional circuit 102D is not operated (Step S17 in FIG. 4). That is, in the semiconductor device, the third functional circuit 102C can be used by itself as the functional circuit which transmits and receives wireless signals to/from a communication device, and power received by the antenna 101 can be efficiently used. Accordingly, reduction in power consumption can be achieved.

The process returns to Step S14. When there is a malfunction in the power supply circuit 104C of the third functional circuit 102C in Step S14, the power supply potential cannot be generated, and the power supply circuit 104C outputs an L-level signal. Accordingly, the power supply control circuit 105C in the third functional circuit 102C outputs an L-level signal from the buffer circuit 211 (Step S18 in FIG. 4).

As illustrated in FIG. 2, the output terminal of the buffer circuit 211 in the power supply control circuit 105C of the third functional circuit 102C is electrically connected to the power supply control circuit 105D in the fourth functional circuit 102D, and processing is performed in the fourth functional circuit 102D depending on the output of the buffer circuit 211 (Step S19 in FIG. 4). Specifically, the processing in Step S19 is processing for turning off the n-channel transistor 214.

When the power supply circuit 104C in the third functional circuit 102C malfunctions, the power supply potential is not supplied to the logic circuit 106C, and the third functional circuit 102C is not operated. On the other hand, the power supply control circuit 105D in the fourth functional circuit 102D does not allow electrical continuity between the output terminal of the power supply circuit 104D and the ground line. That is, Step S19 is a step for selecting the fourth functional circuit 102D except the first functional circuit 102A to the third functional circuit 102C, in which a malfunction occurs, as the functional circuit which transmits and receives wireless signals to/from a communication device.

Next, whether a malfunction occurs in the power supply circuit 104D of the fourth functional circuit 102D is determined (Step S20 in FIG. 4) when a direct current signal is input from the transmission/reception circuit 103D in the fourth functional circuit 102D to the power supply circuit 104D. Note that at this time, a malfunction in the transmission/reception circuit 103D as well as the malfunction in the power supply circuit 104D is judged.

When there is no malfunction in the power supply circuit 104D of the fourth functional circuit 102D in Step S20, the power supply potential is supplied to the logic circuit 106D, and the fourth functional circuit 102D is operated (Step S21 in FIG. 4). That is, in the semiconductor device, the fourth functional circuit 102D can be used by itself as the functional circuit which transmits and receives wireless signals to/from a communication device, and power received by the antenna can be efficiently used. Accordingly, reduction in power consumption can be achieved.

The process returns to Step S20. When there is a malfunction in the power supply circuit 104D of the fourth functional circuit 102D in Step S20, the power supply potential cannot be generated. That is, all the first functional circuit 102A to the fourth functional circuit 102D cannot be operated (Step S22 in FIG. 4). Note that a possibility that all the functional circuits are not operated can be reduced by increasing the number of functional circuits included in the semiconductor device.

That is, a semiconductor device including a plurality of functional circuits illustrated in FIG. 1 and FIG. 2 can transmit and receive wireless signals to/from a communication device by performing the flow of FIG. 3 and FIG. 4 even when external force or impact is applied to the semiconductor device including a plurality of functional circuits having the transmission/reception circuit and the power supply circuit. Accordingly, a semiconductor device with high reliability can be provided. In addition, as shown in the flow of FIG. 3 and FIG. 4, the semiconductor device including a plurality of functional circuits illustrated in FIG. 1 and FIG. 2 can be operated while a function of a functional circuit which does not transmit and receive wireless signals to/from the communication device is suspended. Accordingly, the communication distance between the communication device and the semiconductor device can be increased, and power consumption can be reduced.

Note that in this embodiment mode, what is illustrated in the drawings can be freely combined with or replaced with what is described in other embodiment modes as appropriate.

Embodiment Mode 2

This embodiment mode describes a structure of a semiconductor device in which the reliability of a logic circuit can be improved by providing a determination circuit in addition to the structure of the functional circuit described in Embodiment Mode 1.

Figure 5:
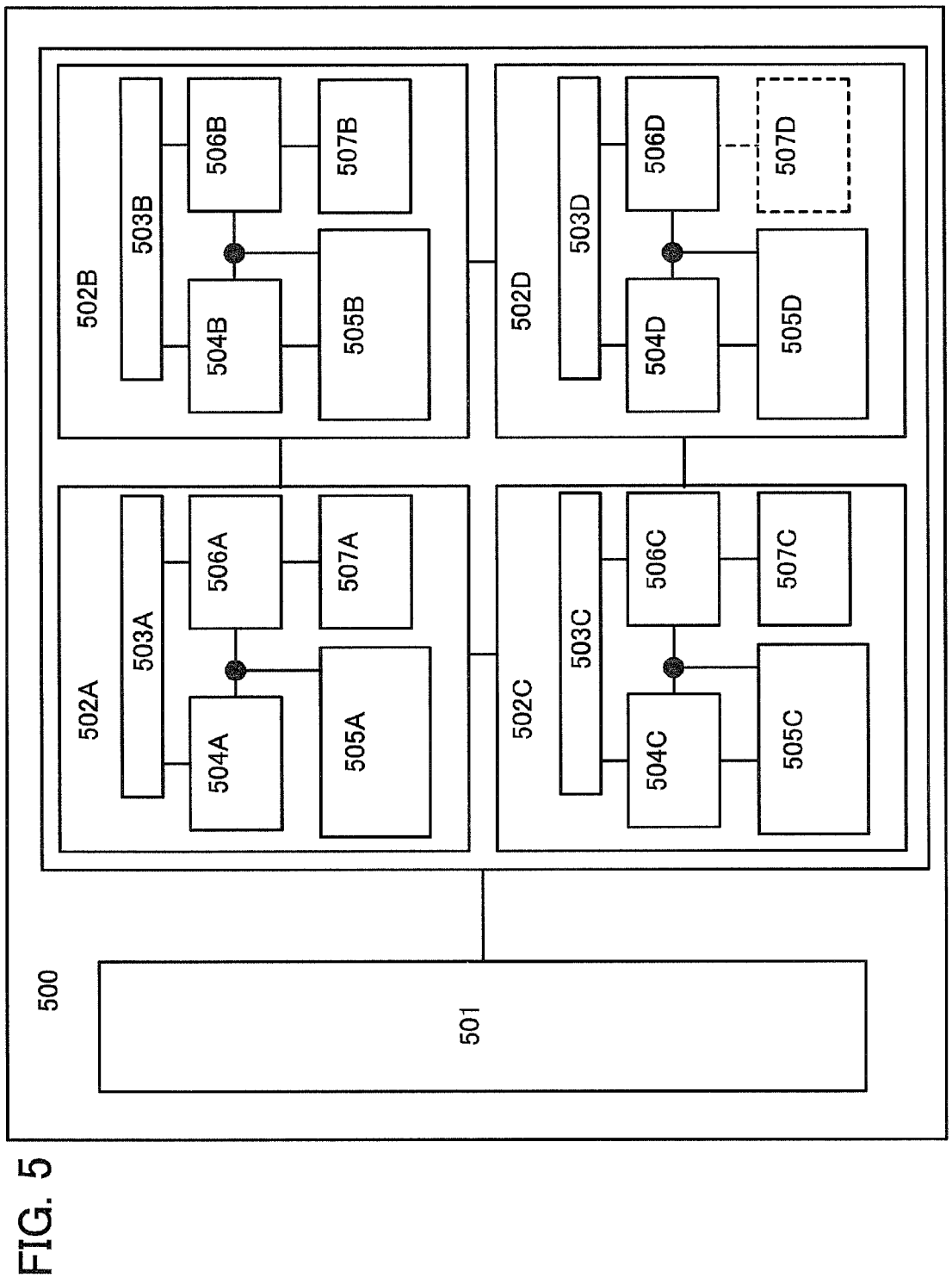
FIG. 5 illustrates Embodiment Mode 2.

A structure of the semiconductor device of the present invention shown in this embodiment mode is described with reference to FIG. 5. FIG. 5 is a block diagram illustrating the semiconductor device of the present invention. A semiconductor device 500 of the present invention includes an antenna 501, a first functional circuit 502A, a second functional circuit 502B, a third functional circuit 502C, and a fourth functional circuit 502D. The first functional circuit 502A includes a transmission/reception circuit 503A, a power supply circuit 504A, a power supply control circuit 505A, a logic circuit 506A, and a determination circuit 507A. The second functional circuit 502B includes a transmission/reception circuit 503B, a power supply circuit 504B, a power supply control circuit 505B, a logic circuit 506B, and a determination circuit 507B. The third functional circuit 502C includes a transmission/reception circuit 503C, a power supply circuit 504C, a power supply control circuit 505C, a logic circuit 506C, and a determination circuit 507C. The fourth functional circuit 502D includes a transmission/reception circuit 503D, a power supply circuit 504D, a power supply control circuit 505D, a logic circuit 506D, and a determination circuit 507D. Note that the antenna 501 is electrically connected to the first functional circuit 502A, the second functional circuit 502B, the third functional circuit 502C, and the fourth functional circuit 502D.

In the block diagram illustrated in FIG. 5, the antenna 501 receives wireless signals of electromagnetic waves from a communication device (not shown) which is provided outside, and transmits signals to the communication device.

Note that in FIG. 5, there is no particular limitation on the shape of the antenna 501. That is, a signal transmission method applied to the antenna 501 in the semiconductor device 500 may be selected as appropriate in consideration of intended use by a practitioner, and an antenna with a length and a shape which are suitable for the transmission method may be provided.

Next, the first functional circuit 502A to the fourth functional circuit 502D are described. Note that in this embodiment mode, a specific example where four functional circuits are used is described for simple explanation; however, there is no particular limitation on the number of functional circuits in the present invention. The present invention can be applied to a semiconductor device with a structure including two or more functional circuits.

As illustrated in FIG. 5, the first functional circuit 502A to the fourth functional circuit 502D in this embodiment mode include the transmission/reception circuits 503A to 503D, the power supply circuits 504A to 504D, the power supply control circuits 505A to 505D, the logic circuits 506A to 506D, and the determination circuits 507A to 507D, respectively.

Note that a functional circuit described in this specification has a function of transmitting and receiving data using wireless signals to/from a communication device. A transmission/reception circuit has functions of demodulating a signal received by an antenna, modulating a signal to be transmitted to the antenna, rectifying and smoothing an alternating current signal output from the antenna. A power supply circuit is a circuit for generating and outputting the power supply potential for operating a logic circuit based on a direct current signal generated in the transmission/reception circuit. A logic circuit includes a circuit for extracting a plurality of codes contained in a command transmitted to the logic circuit; a circuit for comparing the extracted code and a code corresponding to the reference so as to determine the contents of the command; a circuit for detecting the presence of a transmission error or the like based on the determined code; and a circuit for encoding and outputting a signal output from the logic circuit. Moreover, the logic circuit includes a memory circuit in which an ID (identification) code, which is different among functional circuits, is stored. A determination circuit has a function of storing in a memory element included in the determination circuit a result of determination of whether a logic element malfunctions when whether a signal output from the logic circuit is a normal signal or an abnormal signal is determined by a communication device provided outside the semiconductor device.

Next, circuit structures of the first functional circuit 502A to the fourth functional circuit 502D in the semiconductor device of this embodiment mode are shown, and the present invention is described in detail.

Figure 6:
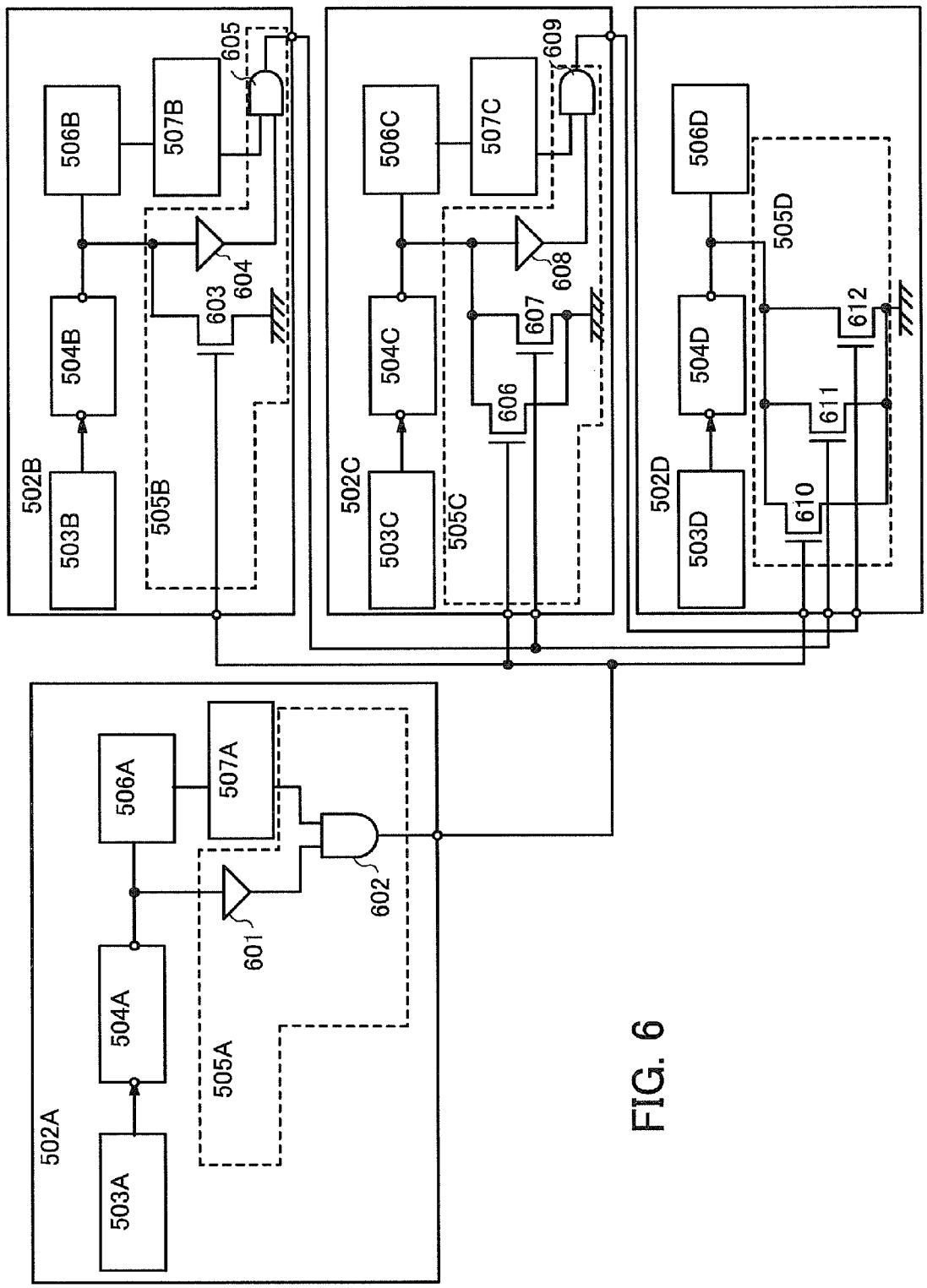
FIG. 6 illustrates Embodiment Mode 2.

FIG. 6 illustrates part of the circuit structures in the block diagram of the first functional circuit 502A to the fourth functional circuit 502D shown in FIG. 5. In the first functional circuit 502A illustrated in FIG. 6, a direct current signal output from the transmission/reception circuit is input to the power supply circuit 504A. The power supply circuit 504A is similar to the power supply circuit 104A illustrated in FIG. 2 of Embodiment Mode 1. An output terminal of the power supply circuit 504A illustrated in FIG. 6 is electrically connected to the power supply control circuit 505A and the logic circuit 506A. An output terminal of the logic circuit 506A illustrated in FIG. 6 is electrically connected to the determination circuit 507A.

The structure of the determination circuit 507A in the first functional circuit 502A illustrated in FIG. 6 is described. The determination circuit 507A has a memory element for obtaining a result of determination of whether a logic element malfunctions when whether a signal output from the logic circuit 506A is a normal signal or an abnormal signal is determined by a communication device provided outside the semiconductor device. Specifically, the determination circuit 507A may include a 1-bit nonvolatile memory element, and preferably includes a write-once memory which is a memory element to which one writing can be performed. In the case where writing to the memory element included in the determination circuit 507A is performed only once, it is preferable to perform writing in a stage of check by a communication device when an operation is confirmed in manufacturing the semiconductor device. It is needless to say that a memory element to which writing can be performed a plurality of times can be used as well. In this case, whether the logic circuit 506A malfunctions can be sequentially written to the memory element, which is preferable in improving the reliability of the semiconductor device. Note that in this embodiment mode, description is made below on the assumption that an output signal from the determination circuit 507A is an L-level signal when the logic circuit 506A malfunctions and an output signal from the determination circuit 507A is an H-level signal when the logic circuit 506A does not malfunction.

Note that as the write-once memory, a fuse element such as a fuse or an antifuse, to which data can be written depending on a conducting state and a non-conducting state may be used. An antifuse is an element whose state is a non-conducting state during manufacture and is changed to a conducting state by supplying an electric signal which is more than a predetermined threshold. Alternatively, a write-once memory may be realized by combining a logic element and a nonvolatile memory such as an EEPROM (electrically erasable and programmable read only memory).

Next, the structure of the power supply control circuit 505A in the first functional circuit 502A illustrated in FIG. 6 is described. To the power supply control circuit 505A, an H-level signal is input from the power supply circuit 504A, or alternatively, an L-level signal is input when the transmission/reception circuit 503A and the power supply circuit 504A are destroyed by external force or impact. Moreover, from the determination circuit 507A to the power supply control circuit 505A, an L-level signal is input when the logic circuit 506A malfunctions, and an H-level signal is input when the logic circuit 506A does not malfunction. The power supply control circuit 505A includes a buffer circuit 601 for improving driving capability of externally outputting an H-level signal or an L-level signal; and an AND circuit 602 for calculating the logical product of a signal from the determination circuit 507A and a signal from the power supply circuit 504A. That is, in the power supply control circuit 505A, the AND circuit 602 outputs an H-level signal when the transmission/reception circuit 503A, the power supply circuit 504A, and the logic circuit 506A are normally operated, whereas the AND circuit 602 outputs an L-level signal when any of the transmission/reception circuit 503A, the power supply circuit 504A, and the logic circuit 506A is destroyed by external force or impact. Note that in this embodiment mode, the buffer circuit 601 is provided on the input terminal side of the AND circuit 602. Alternatively, the buffer circuit 601 may be provided on the output terminal side.

Next, the structure of the power supply control circuit 505B in the second functional circuit 502B illustrated in FIG. 6 is described. Note that the description of the transmission/reception circuit 503B, the power supply circuit 504B, the logic circuit 506B, and the determination circuit 507B is similar to the description of the transmission/reception circuit 503A, the power supply circuit 504A, the logic circuit 506A, and the determination circuit 507A in the first functional circuit 502A.

As in the first functional circuit 502A, to the power supply control circuit 505B in the second functional circuit 502B, an H-level signal is input from the power supply circuit 504B, or alternatively an L-level signal is input when the transmission/reception circuit 503B and the power supply circuit 504B are destroyed by external force or impact. Moreover, as in the first functional circuit 502A, from the determination circuit 507B to the power supply control circuit 505B in the second functional circuit 502B, an L-level signal is input when the logic circuit 506B malfunctions, and an H-level signal is input when the logic circuit 506B does not malfunction. The power supply control circuit 505B in the second functional circuit 502B includes an n-channel transistor 603, a buffer circuit 604, and an AND circuit 605. The buffer circuit 604 is a circuit for improving driving capability of externally outputting an H-level signal or an L-level signal, like the buffer circuit 601. The AND circuit 605 is a circuit, like the AND circuit 602, for outputting an H-level signal when the transmission/reception circuit 503B, the power supply circuit 504B, and the logic circuit 506B are normally operated and outputting an L-level signal when any of the transmission/reception circuit 503B, the power supply circuit 504B, and the logic circuit 506B is destroyed by external force or impact. A first terminal of the n-channel transistor 603 is electrically connected to an output terminal of the power supply circuit 504B. A gate terminal of the n-channel transistor 603 is electrically connected to an output terminal of the AND circuit 602 in the power supply control circuit 505A of the first functional circuit 502A. A second terminal of the n-channel transistor 603 is electrically connected to a ground line.

Next, the structure of the power supply control circuit 505C in the third functional circuit 502C illustrated in FIG. 6 is described. Note that the description of the transmission/reception circuit 503C, the power supply circuit 504C, the logic circuit 506C, and the determination circuit 507C is similar to the description of the transmission/reception circuit 503A, the power supply circuit 504A, the logic circuit 506A, and the determination circuit 507A in the first functional circuit 502A.

As in the first functional circuit 502A, to the power supply control circuit 505C in the third functional circuit 502C, an H-level signal is input from the power supply circuit 504C, or alternatively an L-level signal is input when the transmission/reception circuit 503C and the power supply circuit 504C are destroyed by external force or impact. Moreover, as in the first functional circuit 502A, from the determination circuit 507C to the power supply control circuit 505C in the third functional circuit 502C, an L-level signal is input when the logic circuit 506C malfunctions, and an H-level signal is input when the logic circuit 506C does not malfunction. The power supply control circuit 505C in the third functional circuit 502C includes an n-channel transistor 606, an n-channel transistor 607, a buffer circuit 608, and an AND circuit 609. The buffer circuit 608 is a circuit for improving driving capability of externally outputting an H-level signal or an L-level signal, like the buffer circuit 601. The AND circuit 609 is a circuit, like the AND circuit 602, for outputting an H-level signal when the transmission/reception circuit 503C, the power supply circuit 504C, and the logic circuit 506C are normally operated and outputting an L-level signal when any of the transmission/reception circuit 503C, the power supply circuit 504C, and the logic circuit 506C is destroyed by external force or impact. A first terminal of the n-channel transistor 606 is electrically connected to an output terminal of the power supply circuit 504C. A gate terminal of the n-channel transistor 606 is electrically connected to the output terminal of the AND circuit 602 in the power supply control circuit 505A of the first functional circuit 502A. A second terminal of the n-channel transistor 606 is electrically connected to the ground line. Further, a first terminal of the n-channel transistor 607 is electrically connected to the output terminal of the power supply circuit 504C. A gate terminal of the n-channel transistor 607 is electrically connected to an output terminal of the AND circuit 605 in the power supply control circuit 505B of the second functional circuit 502B. A second terminal of the n-channel transistor 607 is electrically connected to the ground line.

Next, the structure of the power supply control circuit 505D in the fourth functional circuit 502D illustrated in FIG. 6 is described. Note that the description of the transmission/reception circuit 503D, the power supply circuit 504D, the logic circuit 506D, and the determination circuit 507D is similar to the description of the transmission/reception circuit 503A, the power supply circuit 504A, the logic circuit 506A, and the determination circuit 507A in the first functional circuit 502A.

As in the first functional circuit 502A, to the power supply control circuit 505D in the fourth functional circuit 502D, an H-level signal is input from the power supply circuit 504D, or alternatively an L-level signal is input when the transmission/reception circuit 503D and the power supply circuit 504D are destroyed by external force or impact. The power supply control circuit 505D in the fourth functional circuit 502D includes n-channel transistors 610, 611, and 612. Note that FIG. 5 illustrates a structure where the fourth functional circuit 502D includes the determination circuit 507D; however, the fourth functional circuit 502D does not necessarily include the determination circuit 507D. A first terminal of the n-channel transistor 610 is electrically connected to an output terminal of the power supply circuit 504D. A gate terminal of the n-channel transistor 610 is electrically connected to the output terminal of the AND circuit 602 in the power supply control circuit 505A of the first functional circuit 502A. A second terminal of the n-channel transistor 610 is electrically connected to the ground line. Further, a first terminal of the n-channel transistor 611 is electrically connected to the output terminal of the power supply circuit 504D. A gate terminal of the n-channel transistor 611 is electrically connected to the output terminal of the AND circuit 605 in the power supply control circuit 505B of the second functional circuit 502B. A second terminal of the n-channel transistor 611 is electrically connected to the ground line. Moreover, a first terminal of the n-channel transistor 612 is electrically connected to the output terminal of the power supply circuit 504D. A gate terminal of the n-channel transistor 612 is electrically connected to an output terminal of the AND circuit 609 in the power supply control circuit 505C of the third functional circuit 502C. A second terminal of the n-channel transistor 612 is electrically connected to the ground line.

Note that the power supply control circuits 505A to 505D in the first functional circuit 502A to the fourth functional circuit 502D illustrated in FIG. 6 have different structures from each other. Here, considering a structure in which a semiconductor device includes first to N-th functional circuits (N is a natural number of 3 or more), a power supply control circuit in the first functional circuit includes one buffer circuit which is connected to an output terminal of a power supply circuit; and an AND circuit. A power supply control circuit in the i-th functional circuit (i is a natural number of 2 or more and less than N) includes (i−1) n-channel transistors, one buffer circuit, and one AND circuit. A power supply control circuit in the N-th functional circuit includes (N−1) n-channel transistors. In addition, connection of the n-channel transistors, the buffer circuits, and the AND circuits to the power supply circuits or the like can be the connection illustrated in FIG. 6.

Note that when a semiconductor device includes a first functional circuit and a second functional circuit, a power supply control circuit in the first functional circuit includes one buffer circuit which is connected to an output terminal of a power supply circuit; and one AND circuit. A power supply control circuit in the second functional circuit includes one n-channel transistor, one buffer circuit, and one AND circuit. In addition, connection of the n-channel transistor and the buffer circuit to the power supply circuit or the like can be the connection illustrated in FIG. 6.

Operations of the first functional circuit 502A to the fourth functional circuit 502D in the semiconductor device illustrated in FIG. 6 are described with reference to flow charts illustrated in FIG. 7 and FIG. 8.

Figure 7:
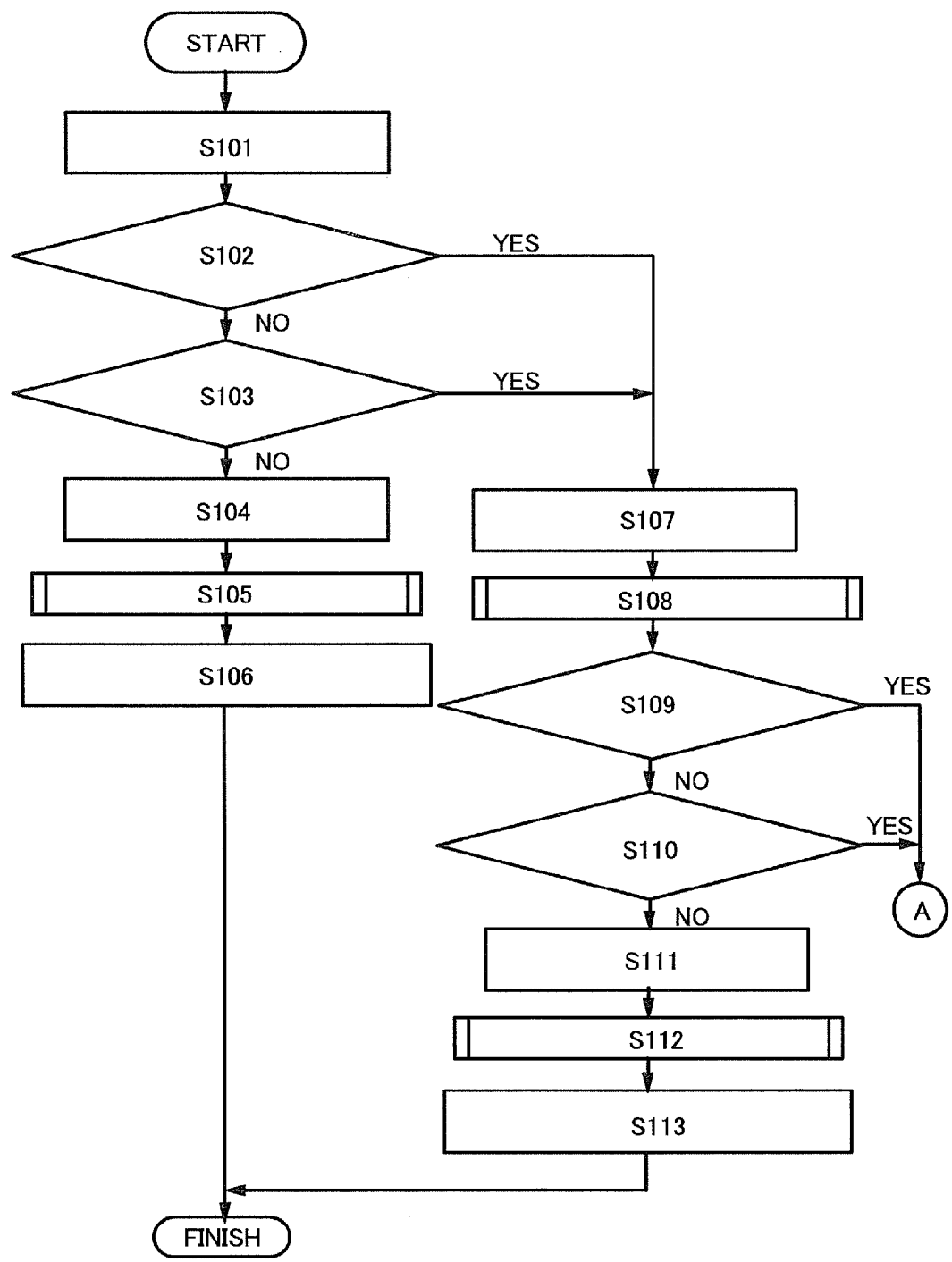
FIG. 7 illustrates Embodiment Mode 2.

First, in the semiconductor device, a wireless signal is transmitted from a communication device to the antenna 501, and an alternating current signal is generated from the wireless signal and input to the transmission/reception circuits 503A to 503D in the first functional circuit 502A to the fourth functional circuit 502D (Step S101 in FIG. 7). Since the antenna is electrically connected to the transmission/reception circuits 503A to 503D in the first functional circuit 502A to the fourth functional circuit 502D, an alternating current signal is equally input to the first functional circuit 502A to the fourth functional circuit 502D.

Next, a direct current signal is input from the transmission/reception circuit 503A in the first functional circuit 502A to the power supply circuit 504A. At this time, whether a malfunction occurs in the power supply circuit 504A of the first functional circuit 502A is determined (Step S102 in FIG. 7). Note that at this time, a malfunction in the transmission/reception circuit 503A as well as the malfunction in the power supply circuit 504A is judged.

Next, whether a malfunction occurs in the logic circuit 506A of the first functional circuit 502A is determined (Step S103 in FIG. 7). Note that actually a malfunction in the logic circuit 506A is not directly determined, but whether the logic circuit 506A malfunctions is written to the memory element in the determination circuit 507A by checking the logic circuit in advance in manufacturing a semiconductor device.

Note that Step S102 and Step S103 are divided in FIG. 7; however, these steps may be performed in reverse order or may be performed at the same time because they are actually determined by the logical product by the AND circuit 602.

When there is no malfunction in the power supply circuit 504A of the first functional circuit 502A in Step S102 and there is no malfunction in the logic circuit 506A in Step S103, the AND circuit 602 in the power supply control circuit 505A of the first functional circuit 502A outputs an H-level signal (Step S104 in FIG. 7).

As illustrated in FIG. 6, the output terminal of the AND circuit 602 in the power supply control circuit 505A of the first functional circuit 502A is electrically connected to the power supply control circuits 505B to 505D in the second functional circuit 502B to the fourth functional circuit 502D, and processing is performed in the second functional circuit 502B to the fourth functional circuit 502D depending on the output of the AND circuit 602 (Step S105 in FIG. 7). Specifically, the processing in Step S105 is processing for turning on the n-channel transistors 603, 606, and 610.

By the processing in Step S105, the power supply potential is supplied to the logic circuit 506A in the first functional circuit 502A. On the other hand, the power supply control circuits 505B to 505D in the second functional circuit 502B to the fourth functional circuit 502D allow electrical continuity between the output terminals of the power supply circuits 504B to 504D and the ground line, whereby the power supply potential is not supplied to the logic circuits 506B to 506D, and the second functional circuit 502B to the fourth functional circuit 502D are not operated (Step S106 in FIG. 7). That is, in the semiconductor device, the first functional circuit 502A can be used by itself as the functional circuit which transmits and receives wireless signals to/from a communication device, and power received by the antenna 501 can be efficiently used. Accordingly, reduction in power consumption can be achieved.

The process returns to Step S102 or Step S103. When there is a malfunction in the power supply circuit 504A of the first functional circuit 502A in Step S102 or when there is a malfunction in the logic circuit 506A of the first functional circuit 502A in Step S103, the AND circuit 602 in the power supply control circuit 505A of the first functional circuit 502A outputs an L-level signal (Step S107 in FIG. 7).

As illustrated in FIG. 6, the output terminal of the AND circuit 602 in the power supply control circuit 505A of the first functional circuit 502A is electrically connected to the power supply control circuits 505B to 505D in the second functional circuit 502B to the fourth functional circuit 502D, and processing is performed in the second functional circuit 502B to the fourth functional circuit 502D depending on the output of the AND circuit 602 (Step S108 in FIG. 7). Specifically, the processing in Step S108 is processing for turning off the n-channel transistors 603, 606, and 610.

When the power supply circuit 504A or the logic circuit 506A in the first functional circuit 502A malfunctions, the first functional circuit 502A is not operated. On the other hand, the power supply control circuits 505B to 505D in the second functional circuit 502B to the fourth functional circuit 502D do not allow electrical continuity between the output terminals of the power supply circuits 504B to 504D and the ground line. That is, Step S108 is a step for selecting one of the second functional circuit 502B to the fourth functional circuit 502D except the first functional circuit 502A, in which a malfunction occurs, as the functional circuit which transmits and receives wireless signals to/from a communication device.

Next, whether a malfunction occurs in the power supply circuit 504B of the second functional circuit 502B is determined (Step S109 in FIG. 7) when a direct current signal is input from the transmission/reception circuit 503B in the second functional circuit 502B to the power supply circuit 504B. Note that at this time, a malfunction in the transmission/reception circuit 503B as well as the malfunction in the power supply circuit 504B is judged.

Next, whether a malfunction occurs in the logic circuit 506B of the second functional circuit 502B is determined (Step S110 in FIG. 7). Note that actually a malfunction in the logic circuit 506B is not directly determined, but whether the logic circuit 506B malfunctions is written to the memory element in the determination circuit 507B by checking the logic circuit in advance in manufacturing a semiconductor device.

Note that Step S109 and Step S110 are divided in FIG. 7; however, these steps may be performed in reverse order or may be performed at the same time because they are actually determined by the logical product by the AND circuit 605.

When there is no malfunction in the power supply circuit 504B of the second functional circuit 502B in Step S109 and there is no malfunction in the logic circuit 506B in Step S110, the AND circuit 605 in the power supply control circuit 505B of the second functional circuit 502B outputs an H-level signal (Step S111 in FIG. 7).

As illustrated in FIG. 6, the output terminal of the AND circuit 605 in the power supply control circuit 505B of the second functional circuit 502B is electrically connected to the power supply control circuits 505C and 505D in the third functional circuit 502C and the fourth functional circuit 502D, and processing is performed in the third functional circuit 502C and the fourth functional circuit 502D depending on the output of the AND circuit 605 (Step S112 in FIG. 7). Specifically, the processing in Step S112 is processing for turning on the n-channel transistors 607 and 611.

By the processing in Step S112, the power supply potential is supplied to the logic circuit 506B in the second functional circuit 502B. On the other hand, the power supply control circuits 505C and 505D in the third functional circuit 502C and the fourth functional circuit 502D allow electrical continuity between the output terminals of the power supply circuits 504C and 504D and the ground line, whereby the power supply potential is not supplied to the logic circuits 506C and 506D, and the third functional circuit 102C and the fourth functional circuit 502D are not operated (Step S113 in FIG. 7). That is, in the semiconductor device, the second functional circuit 502B can be used by itself as the functional circuit which transmits and receives wireless signals to/from a communication device, and power received by the antenna 501 can be efficiently used. Accordingly, reduction in power consumption can be achieved.

The process returns to Step S109 or Step S110. When there is a malfunction in the power supply circuit 504B of the second functional circuit 502B in Step S109 or when there is a malfunction in the logic circuit 506B of the second functional circuit 502B in Step S110 (A in FIG. 7 and FIG. 8), the AND circuit 605 in the power supply control circuit 505B of the second functional circuit 502B outputs an L-level signal (Step S114 in FIG. 8).

Figure 8:
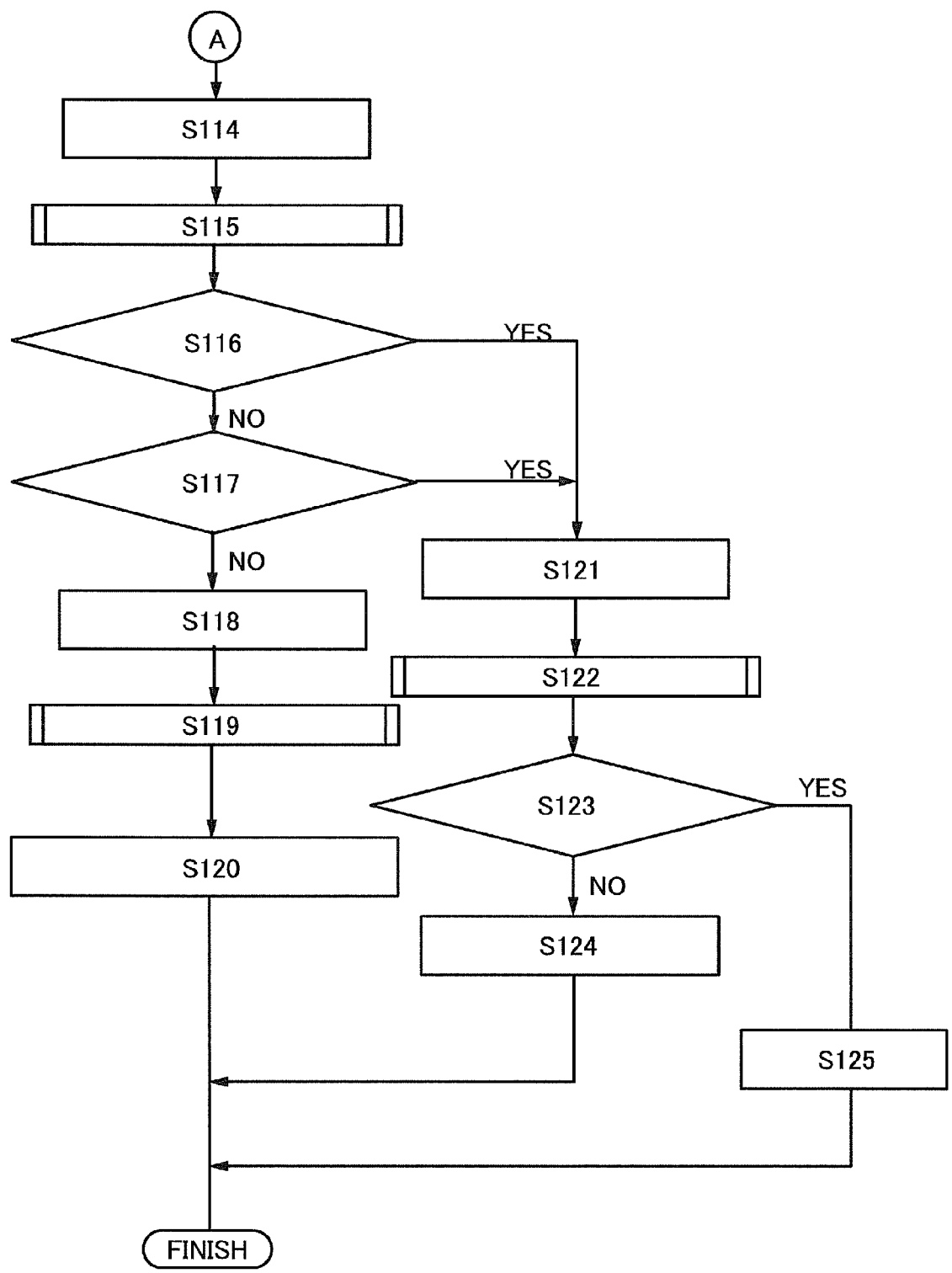
FIG. 8 illustrates Embodiment Mode 2.

As illustrated in FIG. 6, the output terminal of the AND circuit 605 in the power supply control circuit 505B of the second functional circuit 502B is electrically connected to the power supply control circuits 505C and 505D in the third functional circuit 502C and the fourth functional circuit 502D, and processing is performed in the third functional circuit 502C and the fourth functional circuit 502D depending on the output of the AND circuit 605 (Step S115 in FIG. 8). Specifically, the processing in Step S115 is processing for turning off the n-channel transistors 607 and 611.

When the power supply circuit 504B or the logic circuit 506B in the second functional circuit 502B malfunctions, the second functional circuit 502B is not operated. On the other hand, the power supply control circuits 505C and 505D in the third functional circuit 502C and the fourth functional circuit 502D do not allow electrical continuity between the output terminals of the power supply circuits 504C and 504D and the ground line. That is, Step S115 is a step for selecting one of the third functional circuit 502C and the fourth functional circuit 502D except the first functional circuit 502A and the second functional circuit 502B, in which a malfunction occurs, as the functional circuit which transmits and receives wireless signals to/from a communication device.

Next, whether a malfunction occurs in the power supply circuit 504C of the third functional circuit 502C is determined (Step S116 in FIG. 8) when a direct current signal is input from the transmission/reception circuit 503C in the third functional circuit 502C to the power supply circuit 504C. Note that at this time, a malfunction in the transmission/reception circuit 503C as well as the malfunction in the power supply circuit 504C is judged.

Next, whether a malfunction occurs in the logic circuit 506C of the third functional circuit 502C is determined (Step S117 in FIG. 8). Note that actually a malfunction in the logic circuit 506C is not directly determined, but whether the logic circuit 506C malfunctions is written to the memory element in the determination circuit 507C by checking the logic circuit in advance in manufacturing a semiconductor device.

Note that Step S116 and Step S117 are divided in FIG. 8; however, these steps may be performed in reverse order or may be performed at the same time because they are actually determined by the logical product by the AND circuit 609.

When there is no malfunction in the power supply circuit 504C of the third functional circuit 502C in Step S116 and there is no malfunction in the logic circuit 506C in Step S117, the AND circuit 609 in the third functional circuit 502C outputs an H-level signal (Step S118 in FIG. 8).

As illustrated in FIG. 6, the output terminal of the AND circuit 609 in the power supply control circuit 505C of the third functional circuit 502C is electrically connected to the power supply control circuit 505D in the fourth functional circuit 502D, and processing is performed in the fourth functional circuit 502D depending on the output of the AND circuit 609 (Step S119 in FIG. 8). Specifically, the processing in Step S119 is processing for turning on the n-channel transistor 612.

By the processing in Step S119, the power supply potential is supplied to the logic circuit 506C in the third functional circuit 502C. On the other hand, the power supply control circuit 505D in the fourth functional circuit 502D allows electrical continuity between the output terminal of the power supply circuit 504D and the ground line, whereby the power supply potential is not supplied to the logic circuit 506D, and the fourth functional circuit 502D is not operated (Step S120 in FIG. 8). That is, in the semiconductor device, the third functional circuit 502C can be used by itself as the functional circuit which transmits and receives wireless signals to/from a communication device, and power received by the antenna 501 can be efficiently used. Accordingly, reduction in power consumption can be achieved.

The process returns to Step S116 or Step S117. When there is a malfunction in the power supply circuit 504C of the third functional circuit 502C in Step S116 or when there is a malfunction in the logic circuit 506C of the third functional circuit 502C in Step S117, the AND circuit 609 in the power supply control circuit 505C of the third functional circuit 502C outputs an L-level signal (Step S121 in FIG. 8).

As illustrated in FIG. 6, the output terminal of the AND circuit 609 in the power supply control circuit 505C of the third functional circuit 502C is electrically connected to the power supply control circuit 505D in the fourth functional circuit 502D, and processing is performed in the fourth functional circuit 502D depending on the output of the AND circuit 609 (Step S122 in FIG. 8). Specifically, the processing in Step S122 is processing for turning off the n-channel transistor 612.

When the power supply circuit 504C or the logic circuit 506C in the third functional circuit 502C malfunctions, the third functional circuit 502C is not operated. On the other hand, the power supply control circuit 505D in the fourth functional circuit 502D does not allow electrical continuity between the output terminal of the power supply circuit 504D and the ground line. That is, Step S122 is a step for selecting the fourth functional circuit 502D except the first functional circuit 502A to the third functional circuit 502C, in which a malfunction occurs, as the functional circuit which transmits and receives wireless signals to/from a communication device.

Next, whether a malfunction occurs in the power supply circuit 504D of the fourth functional circuit 502D is determined (Step S123 in FIG. 8) when a direct current signal is input from the transmission/reception circuit 503D in the fourth functional circuit 502D to the power supply circuit 504D. Note that at this time, a malfunction in the transmission/reception circuit 503D as well as the malfunction in the power supply circuit 504D is judged.

When there is no malfunction in the power supply circuit 504D of the fourth functional circuit 502D in Step S123, the power supply potential is supplied to the logic circuit 506D, and the fourth functional circuit 502D is operated (Step S124 in FIG. 8). That is, in the semiconductor device, the fourth functional circuit 502D can be used by itself as the functional circuit which transmits and receives wireless signals to/from a communication device, and power received by the antenna 501 can be efficiently used. Accordingly, reduction in power consumption can be achieved.

The process returns to Step S123. When there is a malfunction in the power supply circuit 504D of the fourth functional circuit 502D in Step S123, the power supply potential cannot be generated. That is, all the first functional circuit 502A to the fourth functional circuit 502D cannot be operated (Step S125 in FIG. 8). A possibility that all the functional circuits are not operated can be reduced by increasing the number of functional circuits included in the semiconductor device.

As has been described above, a semiconductor device including a plurality of functional circuits illustrated in FIG. 5 and FIG. 6 can transmit and receive wireless signals to/from a communication device by performing the flow of FIG. 7 and FIG. 8 even when external force or impact is applied to the semiconductor device including a plurality of functional circuits having the transmission/reception circuit, the power supply circuit, and the logic circuit. Accordingly, a semiconductor device with high reliability can be provided. In addition, as shown in the flow of FIG. 7 and FIG. 8, the semiconductor device including a plurality of functional circuits illustrated in FIG. 5 and FIG. 6 can be operated while a function of a functional circuit which does not transmit and receive wireless signals to/from the communication device is suspended. Accordingly, the communication distance between the communication device and the semiconductor device can be increased, and power consumption can be reduced.

Note that in this embodiment mode, what is illustrated in the drawings can be freely combined with or replaced with what is described in other embodiment modes as appropriate.

Embodiment Mode 3

In this embodiment mode, another structure of the power supply control circuit described in Embodiment Mode 2 is described. Note that a block diagram illustrating a semiconductor device corresponds to FIG. 5, and a flow chart illustrating operations corresponds to the description in Embodiment Mode 2. Therefore, this embodiment mode describes the structure of a power supply control circuit in each functional circuit.

Circuit structures of the first functional circuit 502A to the fourth functional circuit 502D in a semiconductor device of this embodiment mode are shown, and the present invention is described in detail.

Figure 18:
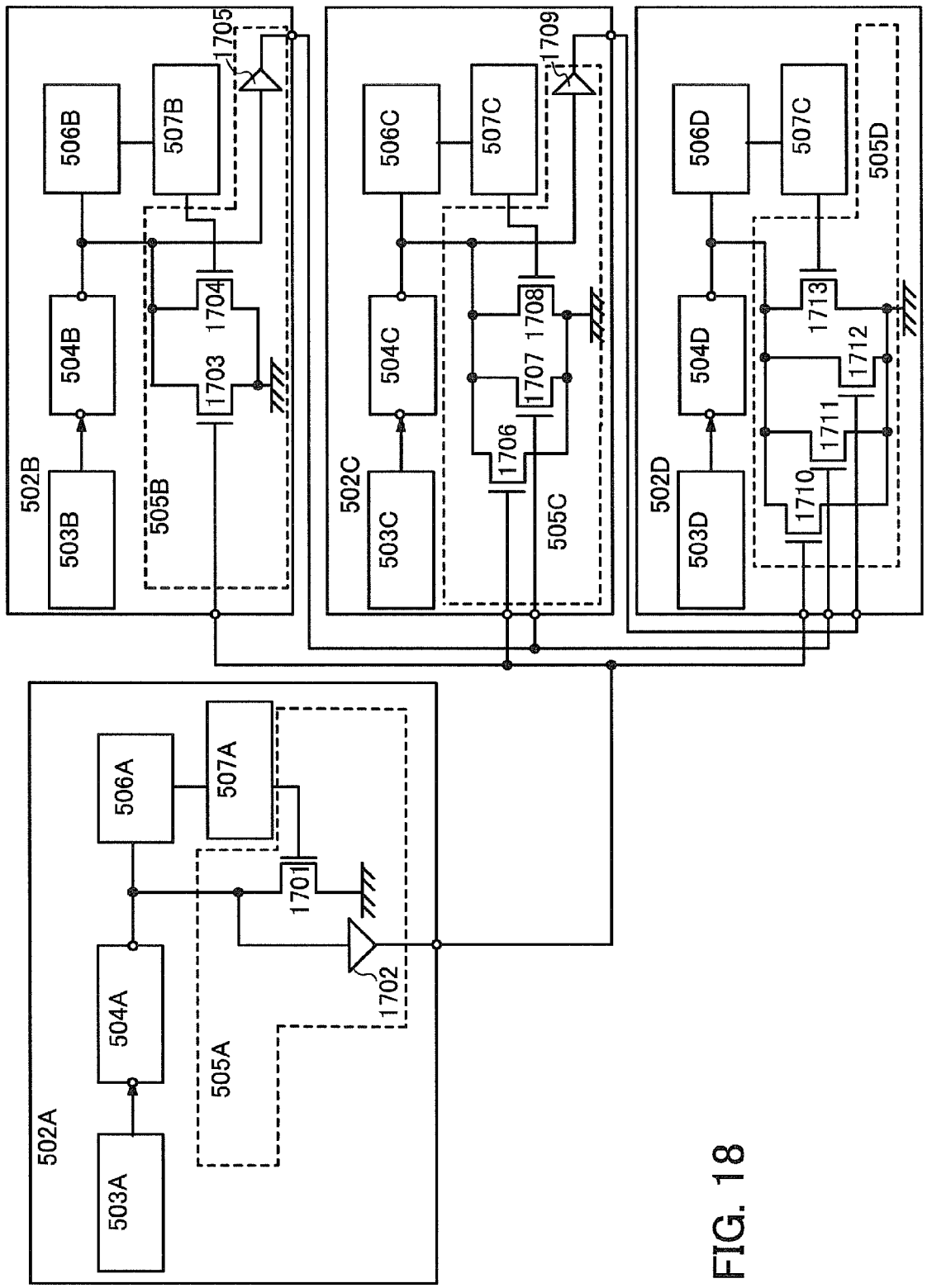
FIG. 18 illustrates Embodiment Mode 3.

FIG. 18 illustrates structures of power supply control circuits which are different from those in the block diagram of the first functional circuit 502A to the fourth functional circuit 502D described in Embodiment Mode 2. In the first functional circuit 502A illustrated in FIG. 18, a direct current signal output from the transmission/reception circuit is input to the power supply circuit 504A as in FIG. 6 of Embodiment Mode 2. The power supply circuit 504A is similar to the power supply circuit 104A illustrated in FIG. 2 of Embodiment Mode 1. An output terminal of the power supply circuit 504A illustrated in FIG. 18 is electrically connected to the power supply control circuit 505A and the logic circuit 506A. An output terminal of the logic circuit 506A illustrated in FIG. 18 is electrically connected to the determination circuit 507A.

The structure of the determination circuit 507A in the first functional circuit 502A illustrated in FIG. 18 is described. As in the determination circuit 507 of Embodiment Mode 2, the determination circuit 507A has a memory element for obtaining a result of determination of whether a logic element in the logic circuit 506A malfunctions. Note that in this embodiment mode, description is made below on the assumption that an output signal from the determination circuit 507A is an H-level signal when the logic circuit 506A malfunctions and an output signal from the determination circuit 507A is an L-level signal when the logic circuit 506A does not malfunction.

Next, the structure of the power supply control circuit 505A in the first functional circuit 502A illustrated in FIG. 18 is described. As in Embodiment Mode 2, to the power supply control circuit 505A, an H-level signal is input from the power supply circuit 504A, or alternatively an L-level signal is input when the transmission/reception circuit 503A and the power supply circuit 504A are destroyed by external force or impact. Moreover, from the determination circuit 507A to the power supply control circuit 505A, an H-level signal is input when the logic circuit 506A malfunctions, and an L-level signal is input when the logic circuit 506A does not malfunction. The power supply control circuit 505A includes an n-channel transistor 1701 for controlling electrical connection between an output terminal of the power supply circuit 504A and a ground line based on a signal from the determination circuit 507A; and a buffer circuit 1702 for improving driving capability of externally outputting an H-level signal or an L-level signal.

Note that in this specification, a transistor for controlling electrical connection between A and B based on a signal from C refers to a transistor of which first terminal is electrically connected to A, second terminal is electrically connected to B, and gate terminal is electrically connected to C.

In the power supply control circuit 505A, first, on or off of the n-channel transistor is selected depending on whether the logic circuit 506A is normally operated, and the potential of the output terminal of the power supply circuit 504A is controlled regardless of whether an output from the power supply circuit 504A is an H-level signal or an L-level signal. Then, the buffer circuit 1702 outputs an H-level signal when the power supply circuit 504A is normally operated, whereas the buffer circuit 1702 outputs an L-level signal when the transmission/reception circuit 503A and the power supply circuit 504A are destroyed by external force or impact.

That is, when the logic circuit 506A malfunctions, the n-channel transistor 1701 in the power supply control circuit 505A is turned on by a signal from the determination circuit 507A. Then, the potential of the output terminal of the power supply circuit 504A is held at low level, and an output signal from the buffer circuit 1702 is set to an L-level signal. Further, when the logic circuit 506A does not malfunction, the n-channel transistor 1701 in the power supply control circuit 505A is turned off by a signal from the determination circuit 507A. Then, when the power supply circuit 504A is normally operated, an output signal from the buffer circuit 1702 is set to an H-level signal. Alternatively, when the power supply circuit 504A malfunctions, an output signal from the buffer circuit 1702 is set to an L-level signal.

Next, the structure of the power supply control circuit 505B in the second functional circuit 502B illustrated in FIG. 18 is described. Note that the description of the transmission/reception circuit 503B, the power supply circuit 504B, the logic circuit 506B, and the determination circuit 507B is similar to the description of the transmission/reception circuit 503A, the power supply circuit 504A, the logic circuit 506A, and the determination circuit 507A in the first functional circuit 502A.

As in the first functional circuit 502A, to the power supply control circuit 505B in the second functional circuit 502B, an H-level signal is input from the power supply circuit 504B, or alternatively, an L-level signal is input when the transmission/reception circuit 503B and the power supply circuit 504B are destroyed by external force or impact. Moreover, from the determination circuit 507B to the power supply control circuit 505B in the second functional circuit 502B, an H-level signal is input when the logic circuit 506B malfunctions, and an L-level signal is input when the logic circuit 506B does not malfunction. The power supply control circuit 505B includes an n-channel transistor 1703 for controlling electrical connection between the output terminal of the power supply circuit 504B and the ground line based on a signal from the buffer circuit 1702; an n-channel transistor 1704 for controlling electrical connection between the output terminal of the power supply circuit 504B and the ground line based on a signal from the determination circuit 507B; and a buffer circuit 1705 for improving driving capability of externally outputting an H-level signal or an L-level signal.

Next, the structure of the power supply control circuit 505C in the third functional circuit 502C illustrated in FIG. 18 is described. Note that the description of the transmission/reception circuit 503C, the power supply circuit 504C, the logic circuit 506C, and the determination circuit 507C is similar to the description of the transmission/reception circuit 503A, the power supply circuit 504A, the logic circuit 506A, and the determination circuit 507A in the first functional circuit 502A.

As in the first functional circuit 502A, to the power supply control circuit 505C in the third functional circuit 502C, an H-level signal is input from the power supply circuit 504C, or alternatively, an L-level signal is input when the transmission/reception circuit 503C and the power supply circuit 504C are destroyed by external force or impact. Moreover, from the determination circuit 507C to the power supply control circuit 505C in the third functional circuit 502C, an H-level signal is input when the logic circuit 506C malfunctions, and an L-level signal is input when the logic circuit 506C does not malfunction. The power supply control circuit 505C includes an n-channel transistor 1706 for controlling electrical connection between the output terminal of the power supply circuit 504C and the ground line based on a signal from the buffer circuit 1702; an n-channel transistor 1707 for controlling electrical connection between the output terminal of the power supply circuit 504C and the ground line based on a signal from the buffer circuit 1705; an n-channel transistor 1708 for controlling electrical connection between the output terminal of the power supply circuit 504C and the ground line based on a signal from the determination circuit 507C; and a buffer circuit 1709 for improving driving capability of externally outputting an H-level signal or an L-level signal.

Next, the structure of the power supply control circuit 505D in the fourth functional circuit 502D illustrated in FIG. 18 is described. Note that the description of the transmission/reception circuit 503D, the power supply circuit 504D, the logic circuit 506D, and the determination circuit 507D is similar to the description of the transmission/reception circuit 503A, the power supply circuit 504A, the logic circuit 506A, and the determination circuit 507A in the first functional circuit 502A.

As in the first functional circuit 502A, to the power supply control circuit 505D in the fourth functional circuit 502D, an H-level signal is input from the power supply circuit 504D, or alternatively, an L-level signal is input when the transmission/reception circuit 503D and the power supply circuit 504D are destroyed by external force or impact. Moreover, from the determination circuit 507D to the power supply control circuit 505D in the fourth functional circuit 502D, an H-level signal is input when the logic circuit 506D malfunctions, and an L-level signal is input when the logic circuit 506D does not malfunction. The power supply control circuit 505D includes an n-channel transistor 1710 for controlling electrical connection between the output terminal of the power supply circuit 504D and the ground line based on a signal from the buffer circuit 1702; an n-channel transistor 1711 for controlling electrical connection between the output terminal of the power supply circuit 504D and the ground line based on a signal from the buffer circuit 1705; an n-channel transistor 1712 for controlling electrical connection between the output terminal of the power supply circuit 504D and the ground line based on a signal from the buffer circuit 1709; and an n-channel transistor 1713 for controlling electrical connection between the output terminal of the power supply circuit 504D and the ground line based on a signal from the determination circuit 507D.

Note that the power supply control circuits 505A to 505D in the first functional circuit 502A to the fourth functional circuit 502D illustrated in FIG. 18 have different structures from each other. Here, considering a structure in which a semiconductor device includes first to N-th functional circuits (N is a natural number of 3 or more), a power supply control circuit in the first functional circuit includes one buffer circuit which is connected to an output terminal of a power supply circuit; and one n-channel transistor for controlling electrical connection between the output terminal of the power supply circuit and the ground line based on a signal from a determination circuit. A power supply control circuit in the i-th functional circuit (i is a natural number of 2 or more and less than N) includes (i−1) n-channel transistors, one buffer circuit, and one n-channel transistor for controlling electrical connection between an output terminal of a power supply circuit and the ground line based on a signal from a determination circuit. A power supply control circuit in the N-th functional circuit includes (N−1) n-channel transistors and one n-channel transistor for controlling electrical connection between an output terminal of a power supply circuit and the ground line based on a signal from a determination circuit. In addition, connection of the n-channel transistors and the buffer circuits to the power supply circuits or the like can be the connection illustrated in FIG. 18.

Note that when a semiconductor device includes a first functional circuit and a second functional circuit, a power supply control circuit in the first functional circuit includes one buffer circuit which is connected to an output terminal of a power supply circuit; and one AND circuit. A power supply control circuit in the second functional circuit includes one n-channel transistor, one buffer circuit, and one AND circuit. In addition, connection of the n-channel transistor and the buffer circuit to the power supply circuit or the like can be the connection illustrated in FIG. 6.

This embodiment mode describes a structure where a power supply control circuit includes one n-channel transistor for controlling electrical connection between an output terminal of a power supply circuit and a ground line based on a signal from a determination circuit, which is different from the structure illustrated in FIG. 6 of Embodiment Mode 2. Accordingly, in the semiconductor device of this embodiment mode, when a logic circuit malfunctions, an output from a power supply circuit can be set to an L-level signal, and another functional circuit can be operated while a functional circuit in which a malfunction occurs is suspended.

In addition, in the structure of the power supply control circuit described in this embodiment mode, each functional circuit includes a determination circuit, so that a malfunction in a logic circuit can be checked. Accordingly, the reliability of the semiconductor device can be improved.

Note that in this embodiment mode, as in Embodiment Mode 2, a semiconductor device can transmit and receive wireless signals to/from a communication device by performing the flow of FIG. 7 and FIG. 8 even when external force or impact is applied to the semiconductor device including a plurality of functional circuits having the transmission/reception circuit, the power supply circuit, and the logic circuit. Accordingly, a semiconductor device with high reliability can be provided. In addition, as shown in the flow of FIG. 7 and FIG. 8, the semiconductor device including a plurality of functional circuits illustrated in FIG. 18 can be operated while a function of a functional circuit which does not transmit and receive wireless signals to/from the communication device is suspended. Accordingly, the communication distance between the communication device and the semiconductor device can be increased, and power consumption can be reduced.

Note that in this embodiment mode, what is illustrated in the drawings can be freely combined with or replaced with what is described in other embodiment modes as appropriate.

Embodiment Mode 4

This embodiment mode describes a method for manufacturing the semiconductor device described in Embodiment Modes 1 to 3. In particular, this embodiment mode shows and describes cross-sectional views, a perspective view, and top views of a semiconductor device including a thin film transistor (TFT) using a semiconductor film formed over an insulating substrate.

Figure 9A:
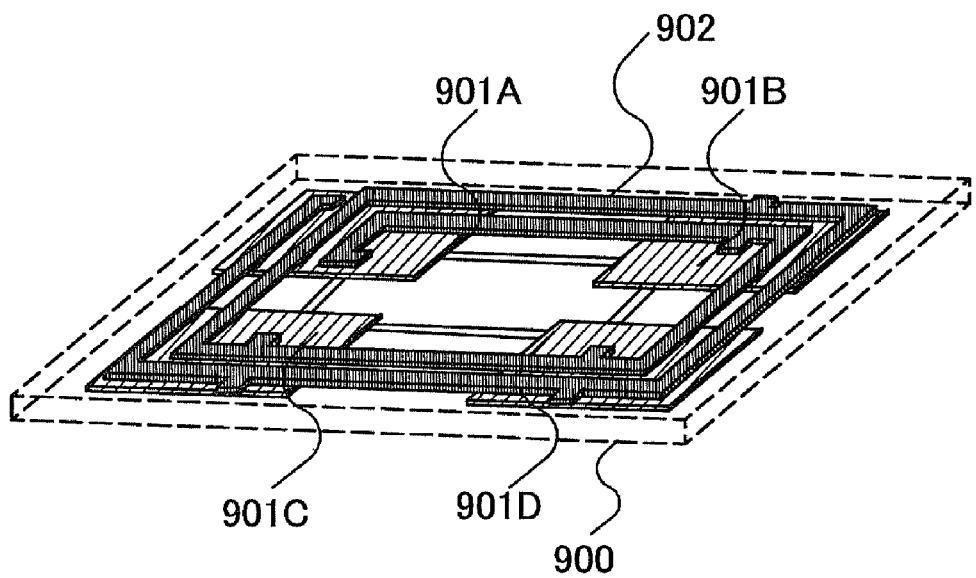
FIGS. 9A and 9B illustrate Embodiment Mode 4.

First, FIG. 9A is a perspective view of a semiconductor device shown in this embodiment mode. As illustrated in FIG. 9A, the semiconductor device of the present invention includes a first functional circuit 901A, a second functional circuit 901B, a third functional circuit 901C, a fourth functional circuit 901D, and an antenna 902 in a sealing layer 900. Note that the semiconductor device may include a booster antenna in addition to the antenna. It is preferable that the semiconductor device include a booster antenna because the communication distance between a communication device and the semiconductor device with wireless signals can be increased.

Figure 9B:
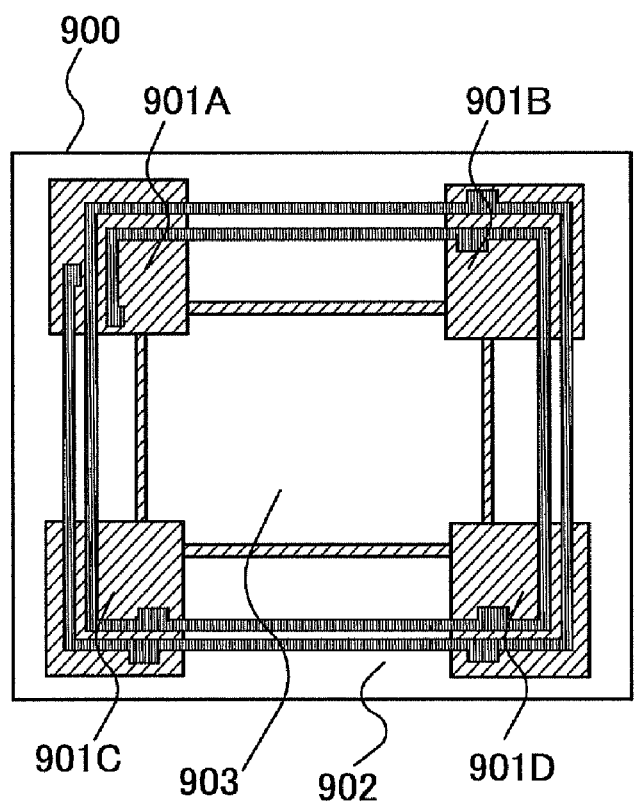

Next, FIG. 9B is a top view of the semiconductor device illustrated in FIG. 9A. The semiconductor device illustrated in FIG. 9B includes, as in FIG. 9A, the first functional circuit 901A, the second functional circuit 901B, the third functional circuit 901C, the fourth functional circuit 901D, and the antenna 902 in the sealing layer 900. Note that there is no particular limitation on arrangement of the first functional circuit 901A, the second functional circuit 901B, the third functional circuit 901C, and the fourth functional circuit 901D in the sealing layer 900. It is acceptable as long as the functional circuits are electrically connected to each other through a wiring 903 and a plurality of the functional circuits are electrically connected to the antenna as illustrated in FIG. 9B. For example, when the functional circuits provided so as to overlap with the antenna are arranged adjacent to each other over a substrate, the wiring 903 is shortened. Accordingly, the size of the semiconductor device can be reduced, and the functional circuits can be protected from external force or impact by the antenna. Moreover, by providing the functional circuits apart from each other, a possibility that the functional circuits are destroyed by external force or impact applied to the semiconductor device can be reduced, and the reliability can be improved.

Figure 16A:
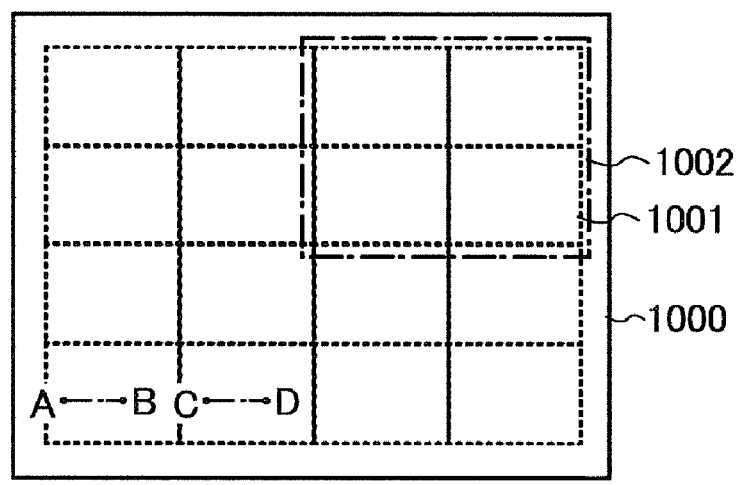
FIGS. 16A to 16C illustrate Embodiment Mode 4.

Next, a semiconductor device in this embodiment mode and a method for manufacturing the semiconductor device are described with reference to top views and cross-sectional views in FIGS. 10A to 10D, FIGS. 11A to 11C, FIGS. 12A and 12B, FIGS. 13A and 13B, FIGS. 14A and 14B, FIGS. 15A and 15B, FIGS. 16A to 16C, and FIGS. 17A and 17B. Note that the cross-sectional views illustrated in FIGS. 10A to 10D, FIGS. 11A to 11C, FIGS. 12A and 12B, FIGS. 13A and 13B, FIGS. 14A and 14B, and FIGS. 15A and 15B are cross-sectional views along the dashed line A-B and C-D in the top views illustrated in FIGS. 16A to 16C and FIGS. 17A and 17B. FIG. 16A illustrates a mode in which a region 1001 and a region 1002 are included over a substrate 1000; an element such as a transistor included in first to fourth functional circuits is formed in the region 1001; and the region 1002 is cut out to serve as a semiconductor device.

Figure 10A:
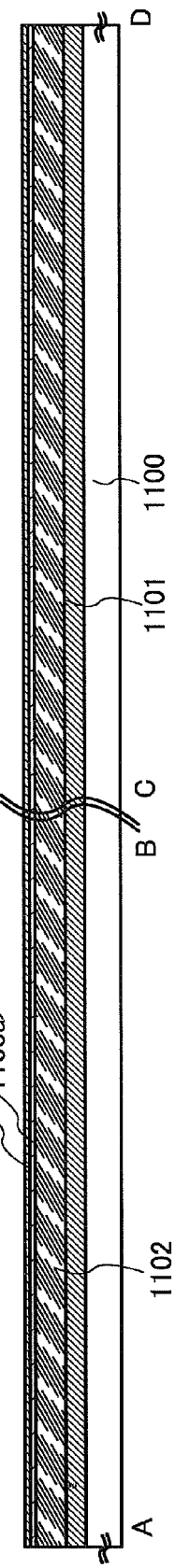
FIGS. 10A to 10D illustrate Embodiment Mode 4.

First, an insulating film 1102 and a base film 1103 including a lower base film 1103a and an upper base film 1103b are formed over a substrate 1100 including a separation layer 1101 (see FIG. 10A).

The substrate 1100 may be any of a glass substrate, a quartz substrate, and a semiconductor substrate. As the separation layer 1101, a metal film or a metal oxide film may be used. In this embodiment mode, a glass substrate is used as the substrate 1100, and a tungsten layer is used as the separation layer 1101.

The insulating film 1102 may be one of a silicon oxide film, a silicon oxide film containing nitrogen, a silicon nitride film, and a silicon nitride film containing oxygen; or a stacked layer of two or more of the above films. In this embodiment mode, a silicon oxide film containing nitrogen is formed as the insulating film 1102.

As the base film 1103, a stacked layer of two or more of a silicon oxide film, a silicon oxide film containing nitrogen, a silicon nitride film, and a silicon nitride film containing oxygen is used. In this embodiment mode, a silicon nitride film containing oxygen is formed as the lower base film 1103a, and a silicon oxide film containing nitrogen is formed as the upper base film 1103b.

Note that a silicon oxide film containing nitrogen refers to a film that contains more oxygen than nitrogen and, in the case where measurements are performed using Rutherford backscattering spectrometry (RBS) and hydrogen forward scattering (HFS), includes oxygen, nitrogen, silicon, and hydrogen at concentrations ranging from 50 at. % to 70 at. %, 0.5 at. % to 15 at. %, 25 at. % to 35 at. %, and 0.1 at. % to 10 at. %, respectively. Further, a silicon nitride film containing oxygen refers to a film that contains more nitrogen than oxygen and, in the case where measurements are performed using RBS and HFS, includes oxygen, nitrogen, silicon, and hydrogen at concentrations ranging from 5 at. % to 30 at. %, 20 at. % to 55 at. %, 25 at. % to 35 at. %, and 10 at. % to 25 at. %, respectively. Note that percentages of nitrogen, oxygen, silicon, and hydrogen fall within the ranges given above, where the total number of atoms contained in silicon oxynitride or silicon nitride oxide is defined as 100 at. %.

Figure 10B:
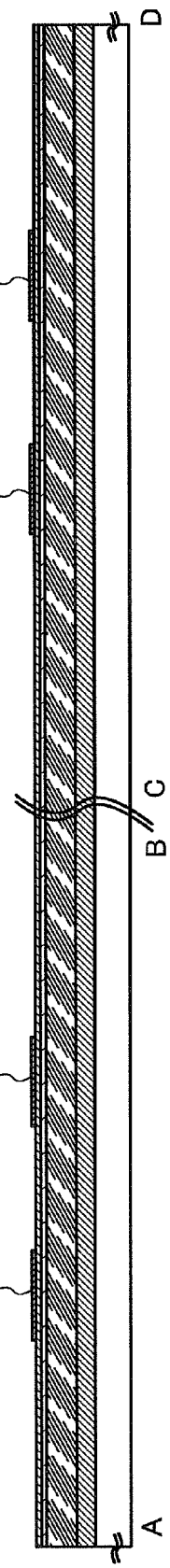

Next, a semiconductor film is formed over the base film 1103 and etched to form island-shaped semiconductor films 1104 (see FIG. 10B).

Then, a gate insulating film 1105 is formed to cover the base film 1103 and the island-shaped semiconductor films 1104.

As the gate insulating film 1105, one of a silicon oxide film, a silicon oxide film containing nitrogen, a silicon nitride film, and a silicon nitride film containing oxygen; or a stacked layer of two or more of the above films may be used. In this embodiment mode, a silicon oxide film containing nitrogen is formed as the gate insulating film 1105.

Gate electrodes 1106 are formed over the island-shaped semiconductor films 1104 with the gate insulating film 1105 interposed therebetween. In this embodiment mode, a stacked layer of a tantalum nitride film and a tungsten film is used for the gate electrode 1106.

Next, an impurity element imparting one conductivity type is added to the island-shaped semiconductor films 1104 using the gate electrodes 1106 as masks, whereby a channel formation region, a source region, and a drain region are formed in the island-shaped semiconductor films 1104.

As the impurity element imparting one conductivity type, phosphorus (P) or arsenic (As) may be used in the case of an impurity element imparting n-type conductivity, and boron (B) may be used in the case of an impurity element imparting p-type conductivity.

An impurity element imparting the same conductivity type may be added to each of the island-shaped semiconductor films 1104, or an impurity element imparting a different conductivity type may be added to the island-shaped semiconductor films 1104.

Next, a passivation film 1107 is formed to cover the base film 1103, the gate insulating film 1105, and the gate electrode 1106. As the passivation film 1107, one of a silicon oxide film, a silicon oxide film containing nitrogen, a silicon nitride film, and a silicon nitride film containing oxygen; or a stacked layer of two or more of the above films may be used. In this embodiment mode, a silicon oxide film containing nitrogen is formed as the passivation film 1107.

Figure 10C:
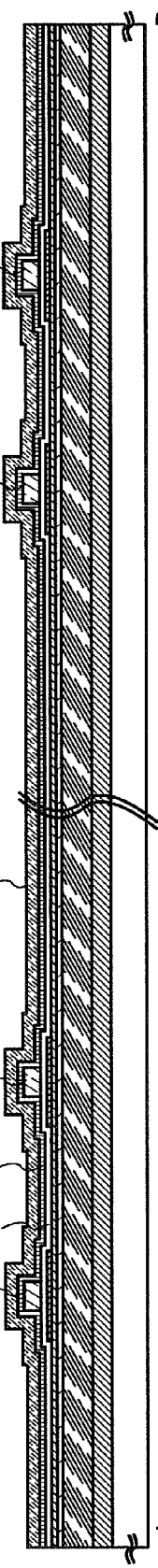

Then, an interlayer insulating film 1108 is formed over the passivation film 1107 (see FIG. 10C). In this embodiment mode, a silicon nitride film containing oxygen is formed as the interlayer insulating film 1108.

Figure 10D:
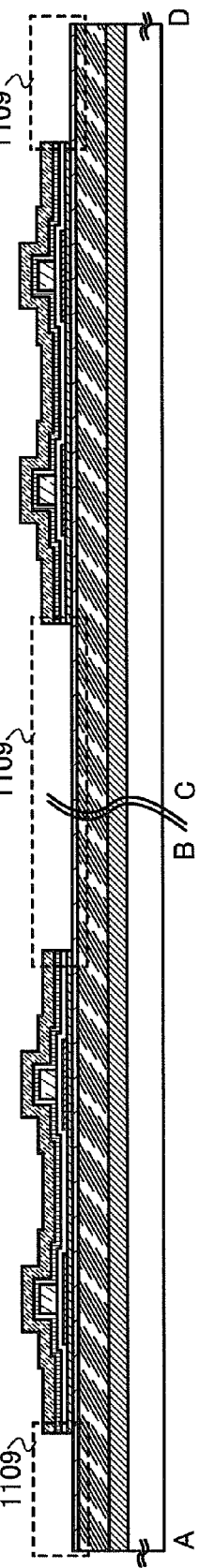
Figure 13A:
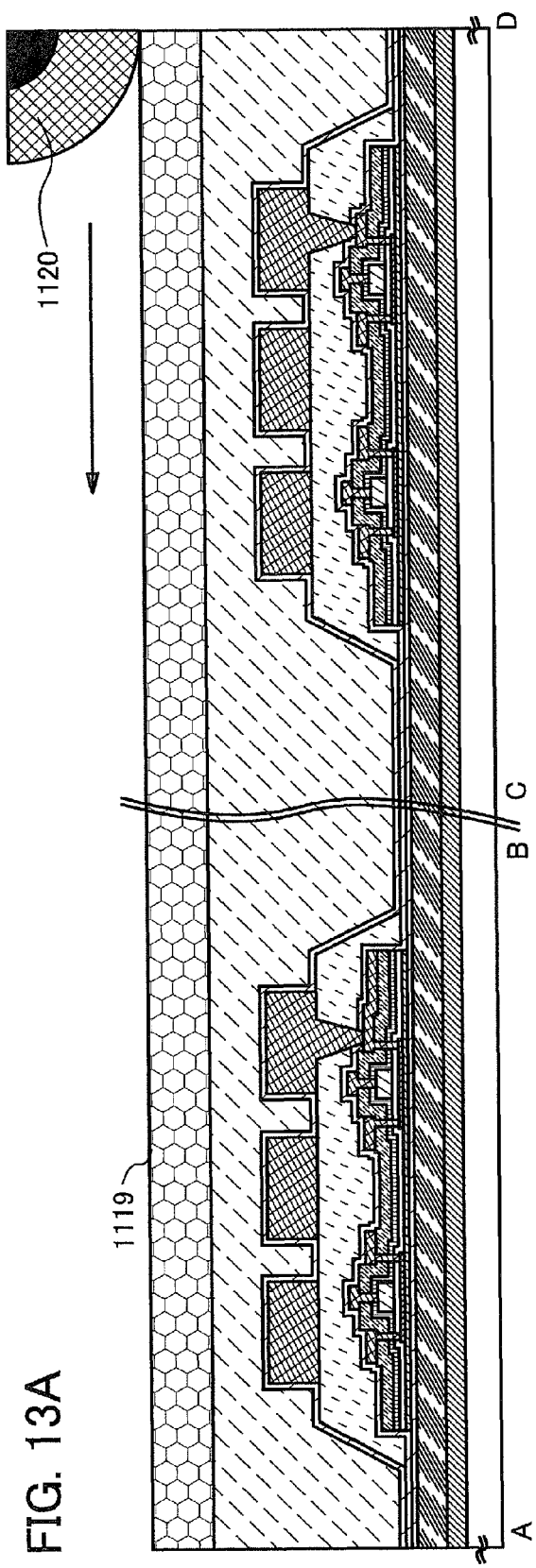
FIGS. 13A and 13B illustrate Embodiment Mode 4.
Figure 13B:
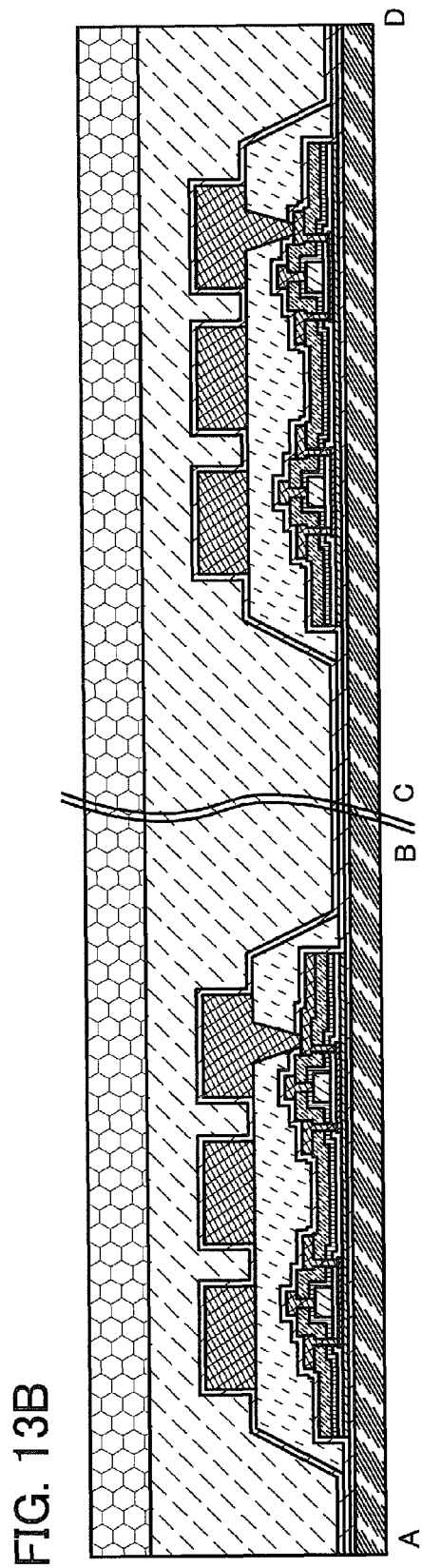

Next, part of the upper base film 1103b, the gate insulating film 1105, the passivation film 1107, and the interlayer insulating film 1108, which corresponds to a region 1109, is etched (see FIG. 10D).

An electrode 1110 which is electrically connected to one of the source region and the drain region of the island-shaped semiconductor film 1104, an electrode 1111 which is electrically connected to the gate electrode 1106, and an electrode 1112 which is electrically connected to the other of the source region and the drain region of the island-shaped semiconductor film 1104 are formed over the interlayer insulating film 1108 (see FIG. 11A). Accordingly, thin film transistors (TFTs) are formed.

Figure 19:
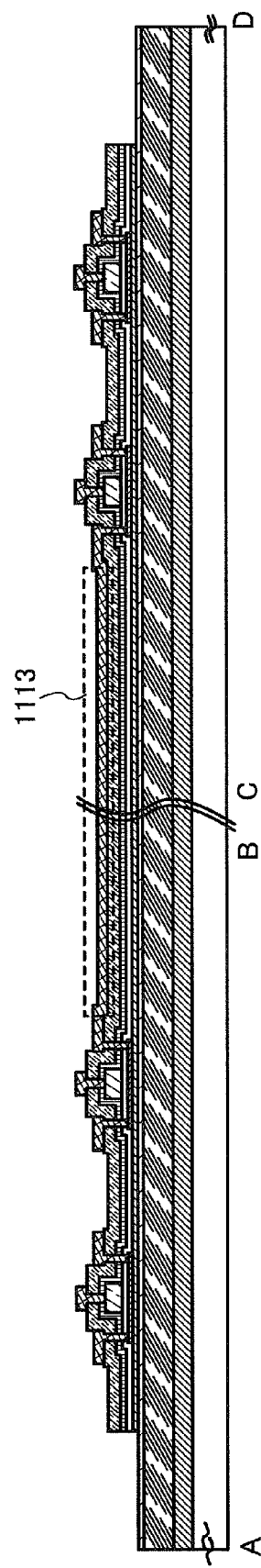
FIG. 19 illustrates Embodiment Mode 4.

Note that together with the electrodes 1110, 1111, and 1112, an electrode 1113 for electrically connecting the electrodes 1110 or the electrodes 1112 to each other in the first to fourth functional circuits is formed. As illustrated in FIG. 19, the electrode 1113 is provided between the functional circuits so as to overlap with part of the upper base film 1103b, the gate insulating film 1105, the passivation film 1107, and the interlayer insulating film 1108 in the etched region 1109, which is left over the substrate 1100 in FIG. 10D, whereby electrical connection between a plurality of functional circuits can be realized.

Figure 16B:
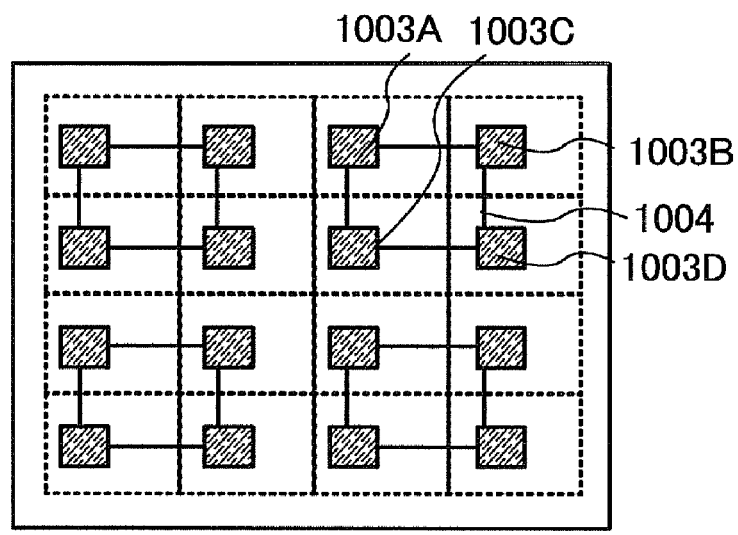

Note that the cross-sectional views in FIG. 11A and FIG. 19 correspond to the top view in FIG. 16B. That is, FIG. 11A and FIG. 19 illustrate a step of forming a first functional circuit 1003A to a fourth functional circuit 1003D, a wiring for electrically connecting the functional circuits to each other, and thin film transistors included in the functional circuits, which are illustrated in FIG. 16B.

Note that in this embodiment mode, the electrodes 1110 to 1113 are formed using a stacked layer of three films of a titanium film, an aluminum film, and a titanium film.

Then, an interlayer insulating film 1114 is formed of a silicon nitride film to cover the lower base film 1103a, the interlayer insulating film 1108, and the electrodes 1110 to 1112. Note that in the region 1109 where the lower base film 1103a and the interlayer insulating film 1114 are in contact with each other, it is preferable to provide unevenness on a surface of the lower base film 1103a because adhesion between the lower base film 1103a and the interlayer insulating film 1114 can be increased.

Next, an interlayer insulating film 1115 is formed using an organic resin (see FIG. 11B). In this embodiment mode, polyimide is used as a material of the interlayer insulating film 1115. In FIG. 11B, the interlayer insulating film 1115 has an opening portion in the region 1109. The opening portion is formed by etching of the interlayer insulating film 1115. It is acceptable as long as the opening portion is formed before a passivation film 1117 described later is formed, and the interlayer insulating film 1115 is not necessarily etched in the step of FIG. 11B.

An antenna 1116 which is electrically connected to the electrode 1112 is formed over the interlayer insulating film 1115 (see FIG. 11C). In this embodiment mode, the antenna 1116 is formed using a stacked layer of a titanium film and an aluminum film.

Figure 16C:
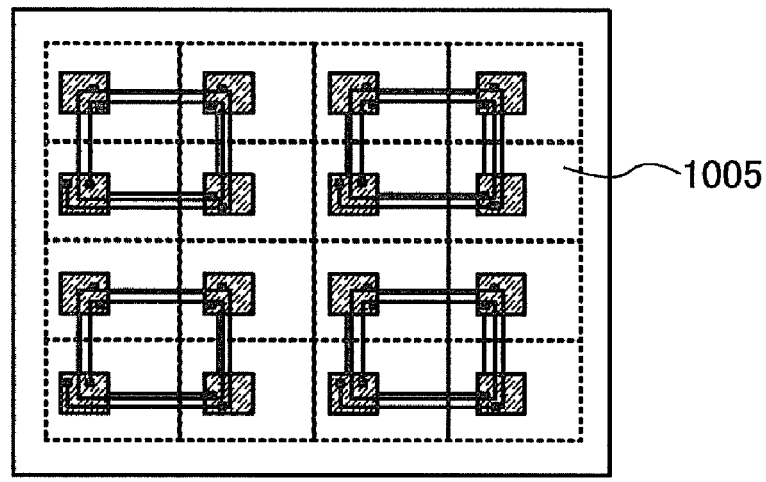

Note that the cross-sectional view in FIG. 11C corresponds to the top view in FIG. 16C. That is, FIG. 11C illustrates a step of forming an antenna 1005 in FIG. 16C.

Then, the passivation film 1117 is formed to cover the interlayer insulating films 1114 and 1115 and the antenna 1116 (see FIG. 12A).

The passivation film 1117 is formed by sequentially forming a silicon nitride film, an amorphous silicon film, and a silicon nitride film. An impurity element imparting one conductivity type may or may not be added to the amorphous silicon film in the passivation film 1117. As the impurity element imparting one conductivity type, phosphorus (P) or arsenic (As) may be added as the impurity element imparting n-type conductivity, and boron (B) may be added as the impurity element imparting p-type conductivity. An amorphous silicon film having conductivity is used for the passivation film 1117, whereby electrostatic discharge occurring in the element can be prevented.

After a stacked-layer structure of FIG. 12A is obtained, a sealing layer 1118 including a fiber body and an organic resin layer is bonded to the passivation film 1117 by pressing (see FIG. 12B).

Figure 17A:
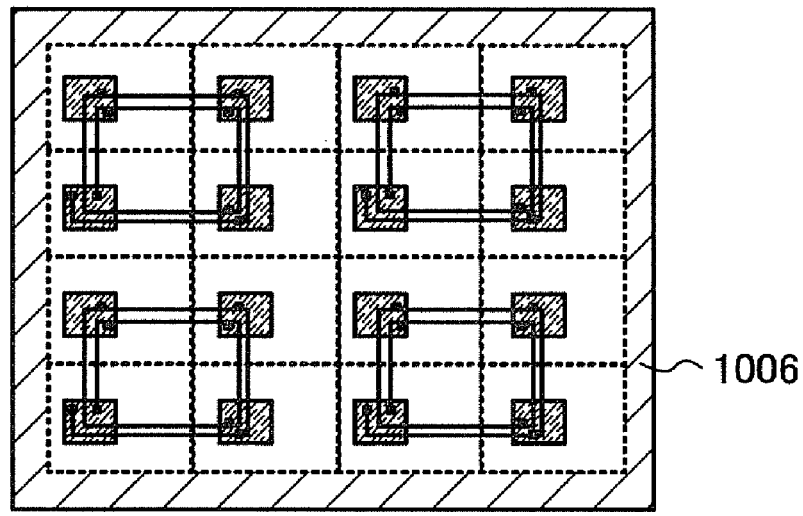
FIGS. 17A and 17B illustrate Embodiment Mode 4.

Note that the cross-sectional view in FIG. 12B corresponds to the top view in FIG. 17A. That is, FIG. 12B illustrates a step of forming a sealing layer 1006 in FIG. 17A.

The sealing layer 1118 includes the fiber body and the organic resin layer. The fiber body is a woven fabric or a nonwoven fabric which uses high-strength fibers of an organic compound or an inorganic compound. The high-strength fiber is specifically a fiber with a high tensile modulus of elasticity or a fiber with a high Young's modulus. Typical examples of the high-strength fiber are a polyvinyl alcohol fiber, a polyester fiber, a polyamide fiber, a polyethylene fiber, an aramid fiber, a polyparaphenylene benzobisoxazole fiber, a glass fiber, and a carbon fiber. As the glass fiber, a glass fiber using E glass, S glass, D glass, Q glass, or the like can be used. Note that the fiber body may be formed from one kind or a plurality of the above high-strength fibers.

When a carbon fiber is used as the fiber body so that the fiber body is conductive, electrostatic discharge can be reduced.

Alternatively, the fiber body may be a woven fabric formed using bundles of fibers (single yarns) (hereinafter also referred to as fiber bundles) for the warp yarn and the weft yarn, or a nonwoven fabric obtained by stacking bundles of plural kinds of fibers in a random manner or in one direction.

The fiber bundle may have a cross section of a circular shape or an elliptical shape. As the bundle of fibers, a bundle of fibers which has been subjected to fiber opening with a high-pressure water stream, high-frequency vibration using liquid as a medium, continuous ultrasonic vibration, pressing with a roller, or the like may be used. A bundle of fibers which is subjected to fiber opening has a large width, has a smaller number of single yarns in the thickness direction, and has a cross section of an elliptical shape or a flat shape. Further, when a loosely twisted yarn is used as the bundle of fibers, the fiber bundle is easily flattened and has a cross section of an elliptical shape or a flat shape. By using a fiber bundle having a cross section of an elliptical shape or a flat shape as described above, it is possible to make the fiber body thinner. Accordingly, the sealing layer can be made thinner, and thus, a thin semiconductor device can be manufactured. Although the diameter of the fiber bundle is preferably 4 μm to 400 μm, and more preferably 4 μm to 200 μm, it is theoretically possible that the diameter of the fiber bundle is even smaller. Moreover, although the thickness of the fiber is preferably 4 μm to 20 μm, it is theoretically possible that the thickness of the fiber is even smaller. Such diameter and thickness depend on a material of the fiber.

Next, an adhesive tape 1119 which can be separated by light or heat is provided over the sealing layer 1118. Then, the separation layer 1101 is separated while a roller 1120 rotates on the adhesive tape 1119 (see FIG. 13A), so that the substrate 1100 is separated (see FIG. 13B).

At this time, when a groove which reaches the separation layer 1101 of the substrate 1100 is formed and a liquid is dropped into the groove, static electricity generated during separation can be prevented, so that separation is more easily performed.

Then, a laser beam 1121 is emitted from the side where the insulating film 1102 is formed, and grooves 1122 are formed in part of the insulating film 1102, the lower base film 1103a, the interlayer insulating film 1114, the passivation film 1117, and the sealing layer 1118 (see FIG. 14A). Note that the adhesive tape 1119 may be separated before or after the groove 1122 is formed.

Next, a sealing layer 1123 including a fiber body and an organic resin layer is bonded by pressing so as to be in contact with the insulating film 1102 (see FIG. 14B). Accordingly, the organic resin in the sealing layer 1123 enters the groove 1122.

Then, a laser beam 1124 is emitted to a region between the adjacent grooves 1122 in the region 1002 illustrated in FIG. 16A (see FIG. 15A), and a chip corresponding to a semiconductor device is cut out (see FIG. 15B).

Figure 17B:
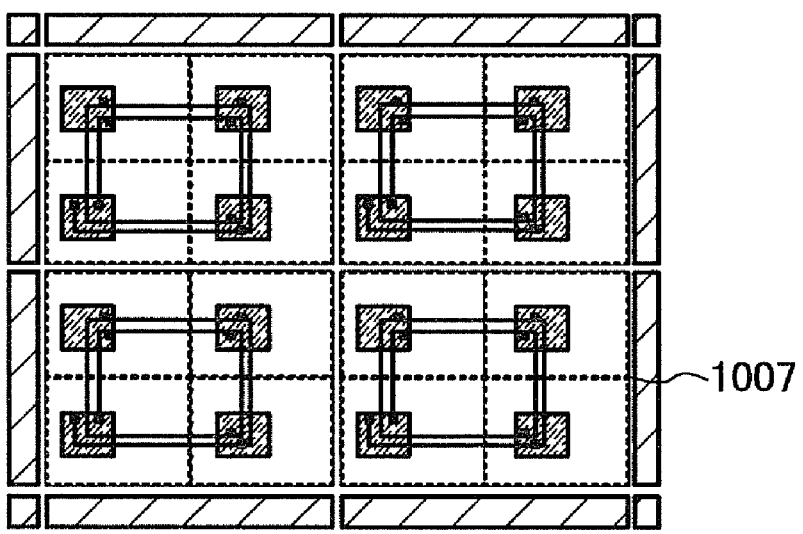

Note that the cross-sectional view in FIG. 15B corresponds to the top view in FIG. 17B. That is, FIG. 15B illustrates a step of forming a chip 1007 corresponding to a semiconductor device in FIG. 17B.

In this embodiment mode, an element such as a TFT is covered with the sealing layers 1118 and 1123. Accordingly, impurity mixing can be suppressed, and stress to bending can be relaxed. Thus, a semiconductor device with high reliability can be obtained.

Moreover, a TFT can be surrounded by the lower base film 1103a, the interlayer insulating film 1114, and the passivation film 1117, whereby impurity mixing can be further suppressed, and a semiconductor device with higher reliability can be obtained.

In this embodiment mode, as in Embodiment Modes 1 to 3, the semiconductor device can transmit and receive wireless signals to/from a communication device even when external force or impact is applied to the semiconductor device including a plurality of functional circuits having a transmission/reception circuit, a power supply circuit, and a logic circuit. Accordingly, a semiconductor device with high reliability can be provided.

Note that in this embodiment mode, what is illustrated in the drawings can be freely combined with or replaced with what is described in other embodiment modes as appropriate.

Embodiment Mode 5

In this embodiment mode, application examples of a semiconductor device capable of inputting and outputting data without contact are described. The semiconductor device of the present invention can be used as a so-called IC label, IC tag, and ID card provided in, for example, bills, coins, securities, bearer bonds, documents (such as driver's licenses and resident's cards), packaging containers (such as wrapping paper and bottles), storage media (such as DVD software and video tapes), vehicles (such as bicycles), personal belongings (such as bags and glasses), foods, plants, animals, human bodies, clothing, commodities, electronic devices, and tags on baggage. The electronic devices refer to liquid crystal display devices, EL display devices, television sets (also simply called televisions or television receivers), mobile phones, and the like. Application examples of the semiconductor device according to the present invention are described below with reference to drawings.

Figure 20A:
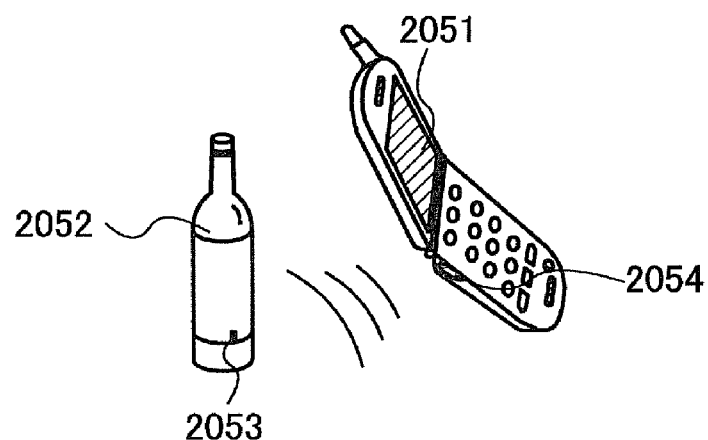
FIGS. 20A and 20B illustrate Embodiment Mode 5.
Figure 20B:
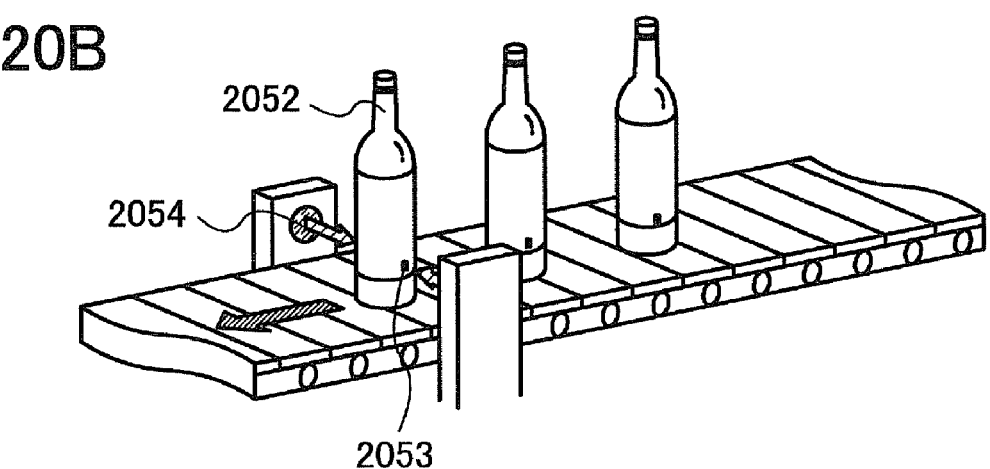

A reader/writer 2054 is provided on a side surface of a mobile terminal including a display portion 2051. A semiconductor device 2053 is provided on a side surface of a product 2052 (see FIG. 20A). When the reader/writer 2054 is put close to the semiconductor device 2053 provided on the product 2052, data on the product, such as the raw material, the place of production, inspection result in each production step, history of the distribution process, and description is displayed on the display portion 2051. Further, when the product 2052 is transported by a conveyor belt, the product 2052 can be inspected using the reader/writer 2054 and the semiconductor device 2053 provided on the product 2052 (see FIG. 20B). As the semiconductor device 2053, the semiconductor device described in Embodiment Modes 1 to 4 can be used. In such a manner, by using the semiconductor device according to the present invention in a system, information can be easily obtained, and high performance and high added value are realized. In addition, the semiconductor device according to the present invention can transmit and receive wireless signals to/from a communication device even when external force or impact is applied to the semiconductor device including a plurality of functional circuits having a transmission/reception circuit, a power supply circuit, and a logic circuit. Accordingly, a semiconductor device with high reliability can be provided.

Note that an applicable range of the semiconductor device according to the present invention is wide in addition to the above examples, and the semiconductor device can be applied to any product as long as it clarifies information of an object, such as the history thereof, without contact and is useful for production, management, or the like.

Note that in this embodiment mode, what is illustrated in the drawings can be freely combined with or replaced with what is described in other embodiment modes as appropriate.

This application is based on Japanese Patent Application Serial No. 2008-20376 filed with Japan Patent Office on Jan. 31, 2008, the entire contents of which are hereby incorporated by reference.

What is claimed is:

1. A semiconductor device comprising:
an antenna configured to transmit a wireless signal to a communication device and receive a wireless signal from the communication device; and
first, second, third, and fourth functional circuits electrically connected to the antenna,
the first functional circuit comprising:
a logic circuit;
a determination circuit configured to output a determination signal depending on whether the logic circuit is normally operated or not;
a power supply circuit configured to supply power supply voltage to the logic circuit; and
a power supply control circuit configured to control power supply voltage output from power supply circuits included in the second, third and fourth functional circuits based on operations of the determination circuit and the power supply circuit included in the first functional circuit,
the second functional circuit comprising:
a determination circuit; and
a power supply control circuit configured to control power supply voltage output from the power supply circuits in the third and fourth functional circuits based on operations of the determination circuit and the power supply circuit included in the second functional circuit, and
the third functional circuit comprising:
a determination circuit; and
a power supply control circuit configured to control power supply voltage output from the power supply circuit in the fourth functional circuit based on operations of the determination circuit and the power supply circuit included in the third functional circuit.

2. The semiconductor device according to claim 1, wherein the determination circuit includes a nonvolatile memory element.

3. The semiconductor device according to claim 2, wherein writing to the nonvolatile memory element can be performed only once.

4. The semiconductor device according to claim 1, wherein each of the first, second, third, and fourth functional circuits includes a thin film transistor.

5. The semiconductor device according to claim 1, wherein the antenna, the first, second, third, and fourth functional circuits are covered with a sealing layer.

6. The semiconductor device according to claim 5, wherein the sealing layer includes a fiber layer and an organic resin layer.

7. The semiconductor device according to claim 1, wherein the first, second, third, and fourth functional circuits are provided to overlap with the antenna.

8. A semiconductor device comprising:
an antenna configured to transmit a wireless signal to a communication device and receive a wireless signal from the communication device; and
first, second, third, and fourth functional circuits electrically connected to the antenna,
the first functional circuit comprising:
a logic circuit;
a determination circuit configured to output a determination signal depending on whether the logic circuit is normally operated or not;
a power supply circuit configured to supply power supply voltage to the logic circuit; and
a power supply control circuit configured to control power supply voltage output from power supply circuits included in the second, third and fourth functional circuits based on operations of the determination circuit and the power supply circuit included in the first functional circuit,
the second functional circuit comprising:
a determination circuit; and
a power supply control circuit configured to control power supply voltage output from the power supply circuits in the third and fourth functional circuits based on operations of the determination circuit and the power supply circuit included in the second functional circuit, and
the third functional circuit comprising:
a determination circuit; and
a power supply control circuit configured to control power supply voltage output from the power supply circuit in the fourth functional circuit based on operations of the determination circuit and the power supply circuit included in the third functional circuit,
wherein each of the power supply control circuit comprised in the first functional circuit, the power supply control circuit comprised in the second functional circuit, and the power supply control circuit comprised in the third functional circuit includes a buffer circuit.

9. The semiconductor device according to claim 8, wherein the determination circuit includes a nonvolatile memory element.

10. The semiconductor device according to claim 9, wherein writing to the nonvolatile memory element can be performed only once.

11. The semiconductor device according to claim 8, wherein each of the first, second, third, and fourth functional circuits includes a thin film transistor.

12. The semiconductor device according to claim 8, wherein the antenna, the first, second, third, and fourth functional circuits are covered with a sealing layer.

13. The semiconductor device according to claim 12, wherein the sealing layer includes a fiber layer and an organic resin layer.

14. The semiconductor device according to claim 8, wherein the first, second, third, and fourth functional circuits are provided to overlap with the antenna.

15. A semiconductor device comprising:
an antenna configured to transmit a wireless signal to a communication device and receive a wireless signal from the communication device; and first, second, third, and fourth functional circuits electrically connected to the antenna, the first functional circuit comprising:
   a logic circuit;
   a determination circuit configured to output a determination signal depending on whether the logic circuit is normally operated or not;
   a power supply circuit configured to supply power supply voltage to the logic circuit; and
   a power supply control circuit configured to control power supply voltage output from power supply circuits included in the second, third and fourth functional circuits based on operations of the determination circuit and the power supply circuit included in the first functional circuit, the second functional circuit comprising:
   a logic circuit;
   a determination circuit configured to output a determination signal depending on whether the logic circuit is normally operated or not;
   a power supply circuit configured to supply power supply voltage to the logic circuit; and
   a power supply control circuit configured to control power supply voltage output from the power supply circuits in the third and fourth functional circuits based on operations of the determination circuit and the power supply circuit included in the second functional circuit, and the third functional circuit comprising:
   a determination circuit; and
   a power supply control circuit configured to control power supply voltage output from the power supply circuit in the fourth functional circuit based on operations of the determination circuit and the power supply circuit included in the third functional circuit.

16. The semiconductor device according to claim 15, wherein the determination circuit includes a nonvolatile memory element.

17. The semiconductor device according to claim 16, wherein writing to the nonvolatile memory element can be performed only once.

18. The semiconductor device according to claim 15, wherein each of the first, second, third, and fourth functional circuits includes a thin film transistor.

19. The semiconductor device according to claim 15, wherein the antenna, the first, second, third, and fourth functional circuits are covered with a sealing layer.

20. The semiconductor device according to claim 19, wherein the sealing layer includes a fiber layer and an organic resin layer.

21. The semiconductor device according to claim 15, wherein the first, second, third, and fourth functional circuits are provided to overlap with the antenna.

* * * * *